United States Patent [19]
Yokota

[11] Patent Number: 5,828,586
[45] Date of Patent: Oct. 27, 1998

[54] HIGH SPEED DEVICE SIMULATING METHOD

[75] Inventor: Ikuhiro Yokota, Tokyo, Japan

[73] Assignee: NEC Corporation, Tokyo, Japan

[21] Appl. No.: 698,375

[22] Filed: Aug. 15, 1996

[30] Foreign Application Priority Data

Aug. 16, 1995 [JP] Japan ................................. 7-208885

[51] Int. Cl.$^6$ ................................................. G06F 17/50
[52] U.S. Cl. .......................................... 364/578; 364/489
[58] Field of Search ................................. 364/488, 489, 364/578, 148, 151, 158; 395/500

[56] References Cited

U.S. PATENT DOCUMENTS

| | | | |
|---|---|---|---|
| 5,103,415 | 4/1992 | Omura et al. ........................... | 364/578 |
| 5,408,638 | 4/1995 | Sagawa et al. ......................... | 395/500 |
| 5,682,338 | 10/1997 | Yokota et al. ......................... | 364/578 |
| 5,684,723 | 11/1997 | Nakadai et al. ........................ | 364/578 |

OTHER PUBLICATIONS

Franz et al., "Finite Boxes–A Generalization of the Finite Difference Method Suitable for Semiconductor Device Simulation", IEEE, Jun. 1983, pp. 1070–1082.

Bank et al., "Numerical Methods for Semiconductor Device Simulation", IEEE, Jun. 1983, pp. 1031–1041.

Wu et al., "A Stride Towards Practical 3–D Device Simulation–Numerical and Visualization Considerations", IEEE Sep. 1991, pp. 1132–1140.

Akcasu, "Convergence Properties of Newton's Method for the Solution of the Semiconductor Transport Equations and Hybrid Solution Techniques for Multidimensional Simulation of VLSI Devices," Solid–State Electronics., vol. 27, No.4, pp. 319–328, 1984.

Franz et al., "Bambi—A Design Model for Power MOS-FET's," IEEE Transactions on Computer–Aided Design., vol. CAD–4, No. 3, Jul. 1985, pp. 177–189.

Bank et al., "Transient Simulation of Silicon Devices and Circuits," IEEE Transactions on Electron Devices., vol. Ed–32, No.10, Oct. 1985, pp. 1992–2007.

*Primary Examiner*—Kevin J. Teska
*Assistant Examiner*—Thai Phan
*Attorney, Agent, or Firm*—Foley & Lardner

[57] ABSTRACT

In a method for simulating parameters including a potential in a semiconductor device, deviations of the parameters are calculated for a plurality of nodes of a mesh in the semiconductor device by Newton's method. However, when absolute values of electric fields are larger than a first value and deviations of the electric fields are larger than a second value, the parameters are renewed by adding values smaller than the deviations of the parameters thereto. Otherwise, the parameters are renewed by adding the deviations of the parameters thereto.

12 Claims, 25 Drawing Sheets

HIGH SPEED DEVICE SIMULATING METHOD

BACKGROUND OF THE INVENTION

1. Field of the Invention

The present invention relates to a method for simulating parameters including a potential in a semiconductor device.

2. Description of the Related Art

Semiconductor device simulating methods have recently become available. That is, in these simulating methods, carriers such as electrons and holes are considered to consititute a fluid. By using a fluid correlation, a drift diffusion model or an energy transport model can be used to simulate the semiconductor device.

Generally, in these simulations, either a coupled solution method or a decoupled solution method, each using Newton's method, is applied.

In the above-mentioned coupled solution method, if initial values are appropriate, the final approximations can be rapidly obtained. However, if the initial values are inappropriate, the convergence characteristics of the parameters are deteriorated, and, at worst, the final approximations cannot be obtained.

On the other hand, in the above-mentioned decoupled method, the convergence characteristics of the parameters are not dependent upon their initial values. However, it takes a long time to converge the parameters using the decoupled method.

In view of the foregoing, usually, the coupled solution method using Newton's method is applied as a solution method of the basic equations of semiconductor transport.

However, the basic equations of semiconductor transport have strong nonlinearity. Therefore, if the approximations of the parameters greatly fluctuate, the approximations are so oscillated that it is impossible to converge the approximations. At worst, it is impossible to obtain final solutions.

SUMMARY OF THE INVENTION

It is an object of the present invention to provide a high speed device simulating method.

According to the present invention, in a method for simulating parameters including a potential in a semiconductor device, deviations of the parameters are calculated for a plurality of nodes of a mesh in the semiconductor device by Newton's method. When absolute values of electric fields are larger than a first value and deviations (or ratios) of the electric fields are larger than a second value, the parameters are renewed by adding values smaller than the deviations of the parameters thereto. Otherwise, the parameters are renewed by adding the deviations of the parameters thereto.

That is, in a strong nonlinearity region, the parameters are renewed to a lesser extent. On the other hand, in a weak nonlinearity region, the parameters are renewed to a greater extent.

BRIEF DESCRIPTION OF THE DRAWINGS

The present invention will be more clearly understood from the description as set forth below, in comparison with the prior art, and with reference to the accompanying drawings, wherein.

DESCRIPTION OF THE PREFERRED EMBODIMENT

Before the description of the preferred embodiment, prior art simulating methods will be explained with reference to FIGS. 1, 2, 3, 4 and 5.

Figure 1:
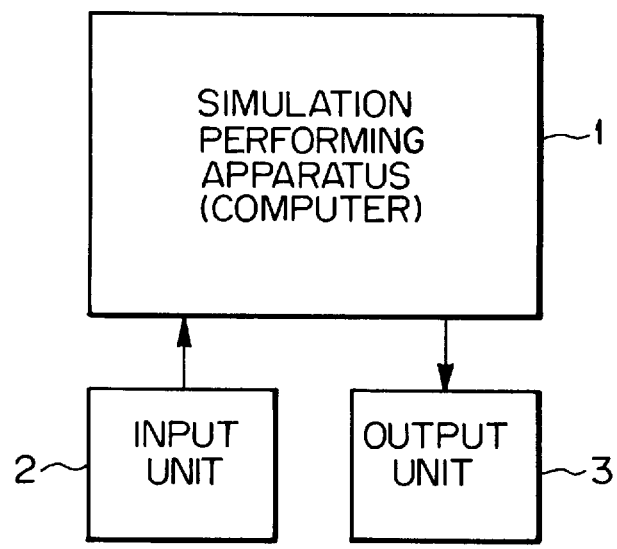
FIG. 1 is a block circuit diagram illustrating a prior art simulation system.

In FIG. 1, which illustrates a prior art simulation system, the simulation system is comprised of a simulation performing apparatus 1 such as a computer, an input unit 2 for inputting initial simulation values, and an output unit 3 for outputting a simulation result. The simulation preforming apparatus 1 is comprised of a central processing unit (CPU), a read-only memory (ROM), a random access memory (RAM), and the like.

Figure 2:
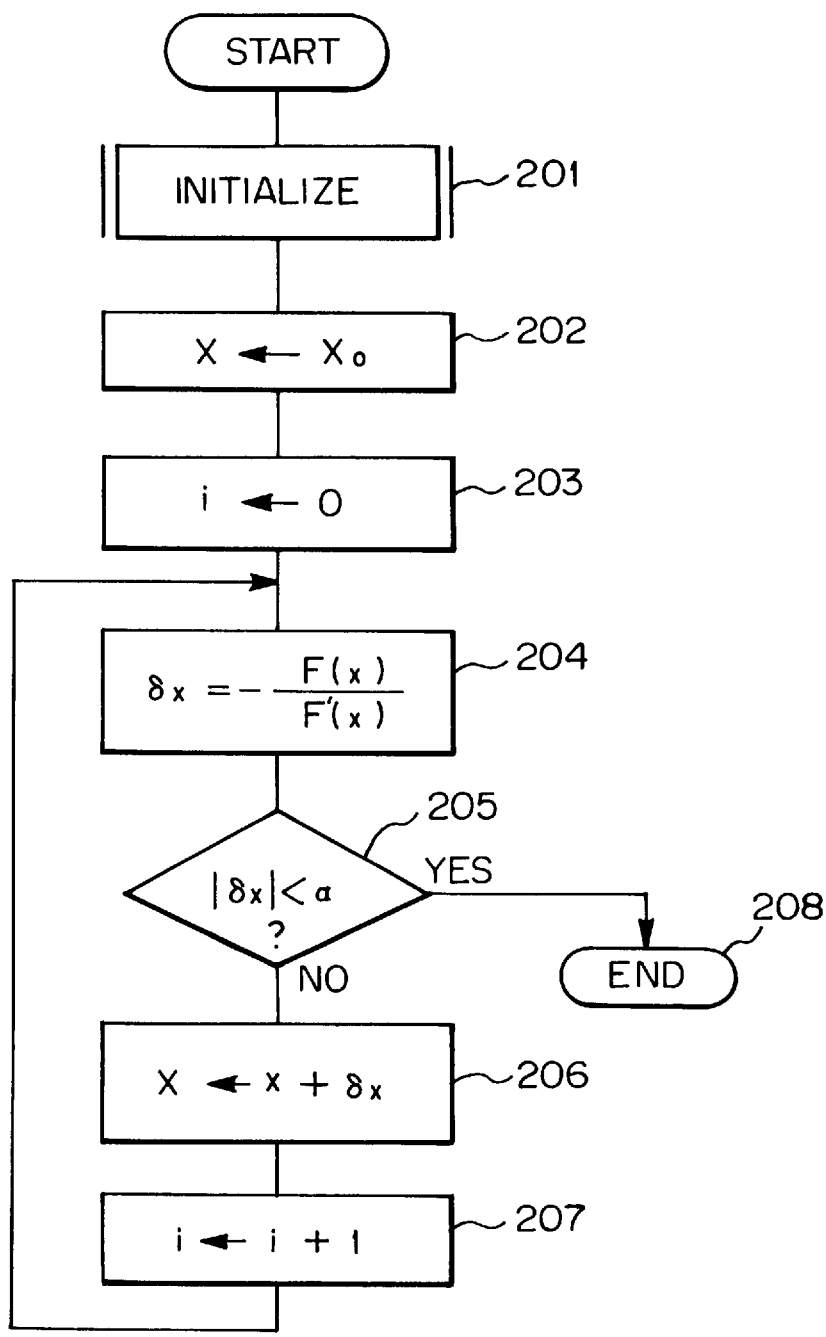
FIG. 2 is a flowchart showing a prior art using Newton's method.

First, Newton's method for a non-linear equation $F(X)=0$ is explained with reference to FIG. 2 which shows an operation of the CPU of FIG. 1.

First, at step 201, an initialization is carried out for inputting the equation F (X)=0.

Next, at step 202, a variable X is given an initial approximation $X_0$. Also, at step 203, a value i is initialized at 0.

Next, at step 204, a first derivative F'(X) is calculated. Then, $$\delta X \leftarrow -F(X)/F'(X)$$

In this case, note that a Taylor series of F (X+δX) is represented by $$F(X + \delta X) = F(X) + F'(X) \cdot \delta X + 1/2 F''(X) \cdot \delta X^2 + \ldots$$

If δX is sufficiently small, the following can be assumed:

$$F(X + \delta X) = F(X) + F'(X) \cdot \delta X.$$

Therefore, since δX=–F(X)/F'(X), $$F(X+\delta X)=0$$

Next, at step 205, it is determined whether or not the following convergence condition is satisfied:

$$|\delta X| < \alpha$$

where α is a small positive value.

If $|\delta X| \geq \alpha$, the control proceeds to step 206 which calculates a better approximation by $$X \leftarrow X + \delta X$$

Also, at step 207, the value i is increased by 1. Then, the control at steps 204, 205, 206 and 207 is repeated. However, if $|\delta X| < \alpha$, the control proceeds to step 208, thus completing the routine of FIG. 2. Thus, the final value X at step 208 is a best solution of F (X)=0.

Note that, if the final value i is small, it means that the convergence rate is large.

Next, the basic equations of semiconductor transport can be written in the following manner.

A principle of conservation of charge is represented by $$\text{div } \vec{D} = \rho \tag{1}$$

$$\vec{D} = \epsilon \vec{E}$$

$$\vec{E} = -grad\ \phi$$

$$\rho = q\ (p-n+N_D-N_A)$$

where $\vec{D}$ is an electric displacement;
ρ is a charge density;
$\vec{E}$ is an electric field;
ε is a permittivity;
q is the electric charge;
p is a hole concentration;
n is an electron concentration;
$N_D$ is a concentration of donor impurities; and
$N_A$ is a concentration of acceptor impurities.

Note that the equation (1) corresponds to Poisson's equation:

$$\Delta \phi = -\rho \tag{1'}$$

Also, the current continuity equations for electrons and holes are represented by $$\text{div } \vec{J}_n = q(R-G) \tag{2}$$

$$\text{div } \vec{J}_p = -q(R-G) \tag{3}$$

where $\vec{J}_n$ is an electron current density;
$\vec{J}_p$ is a hole current density;
R is a rate of recombination of electron-hole pairs; and
G is a rate of generation of electron-hole pairs.

The current densities in the current continuity equations (2) and (3) can be replaced by the following equations for electrons and holes:

$$\vec{J}_n = q \cdot n \cdot \mu_n \cdot \vec{E} + q \cdot D_n \cdot grad\ n \tag{2'}$$

$$\vec{J}_p = q \cdot p \cdot \mu_p \cdot \vec{E} - q \cdot D_p \cdot grad\ p \tag{3'}$$

where $\mu_n$ is an electron mobility;
$\mu_p$ is a hole mobility;
$D_n$ is a diffusion coefficient of electrons and has an Einstein relation $D_n = \mu_n \cdot kT/q$ (k: Boltzmann constant and T is an absolute temperature); and
$D_p$ is a diffusion coefficient of holes and has an Einstein relation $D_p = \mu_p \cdot kT/q$.

Figure 3:
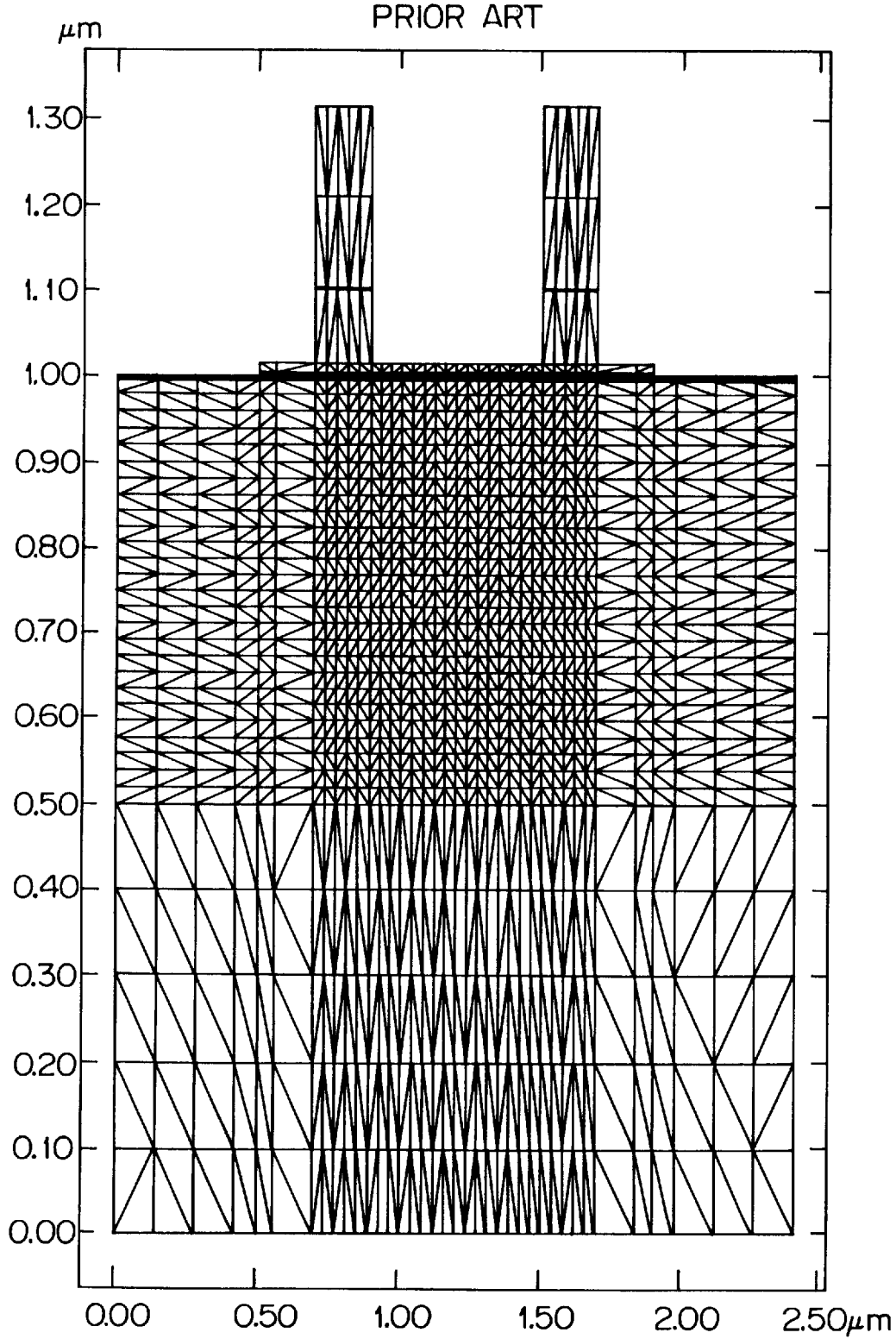
FIG. 3 is a diagram illustrating a mesh configuration provided for a MOS transistor.

The above-mentioned Newton's method is applied to a lightly-doped drain (LDD) metal-oxide-semiconductor MOS transistor as illustrated in FIG. 3. In this case, a mesh having N nodes is provided within a simulation region, and a potential $\phi_k$, an electron concentration $n_k$ and a hole concentration $p_k$ are given to each node k (k=1, 2, ..., N). Also, the equations (1) (or (1)'), (2) (or (2)') and (3) (or (3)') are simply referred to as $$F_\phi(\phi, n, p) = 0 \tag{4}$$

$$F_n(\phi, n, p) = 0 \tag{5}$$

$$F_p(\phi, n, p) = 0 \tag{6}$$

In more detail, $$F_{\phi 1}(\phi, n, p) = 0 \text{ for node } 1$$

$$F_{\phi 2}(\phi, n, p) = 0 \text{ for node } 2$$

$$\vdots$$

$$F_{\phi N}(\phi, n, p) = 0 \text{ for node } N$$

$$F_{n1}(\phi, n, p) = 0 \text{ for node } 1$$

$$F_{n2}(\phi, n, p) = 0 \text{ for node } 2$$

$$\vdots$$

$$F_{nN}(\phi, n, p) = 0 \text{ for node } N$$

$$F_{p1}(\phi, n, p) = 0 \text{ for node } 1$$

$$F_{p2}(\phi, n, p) = 0 \text{ for node } 2$$

$$\vdots$$

$$F_{pN}(\phi, n, p) = 0 \text{ for node } N$$

Figure 4:
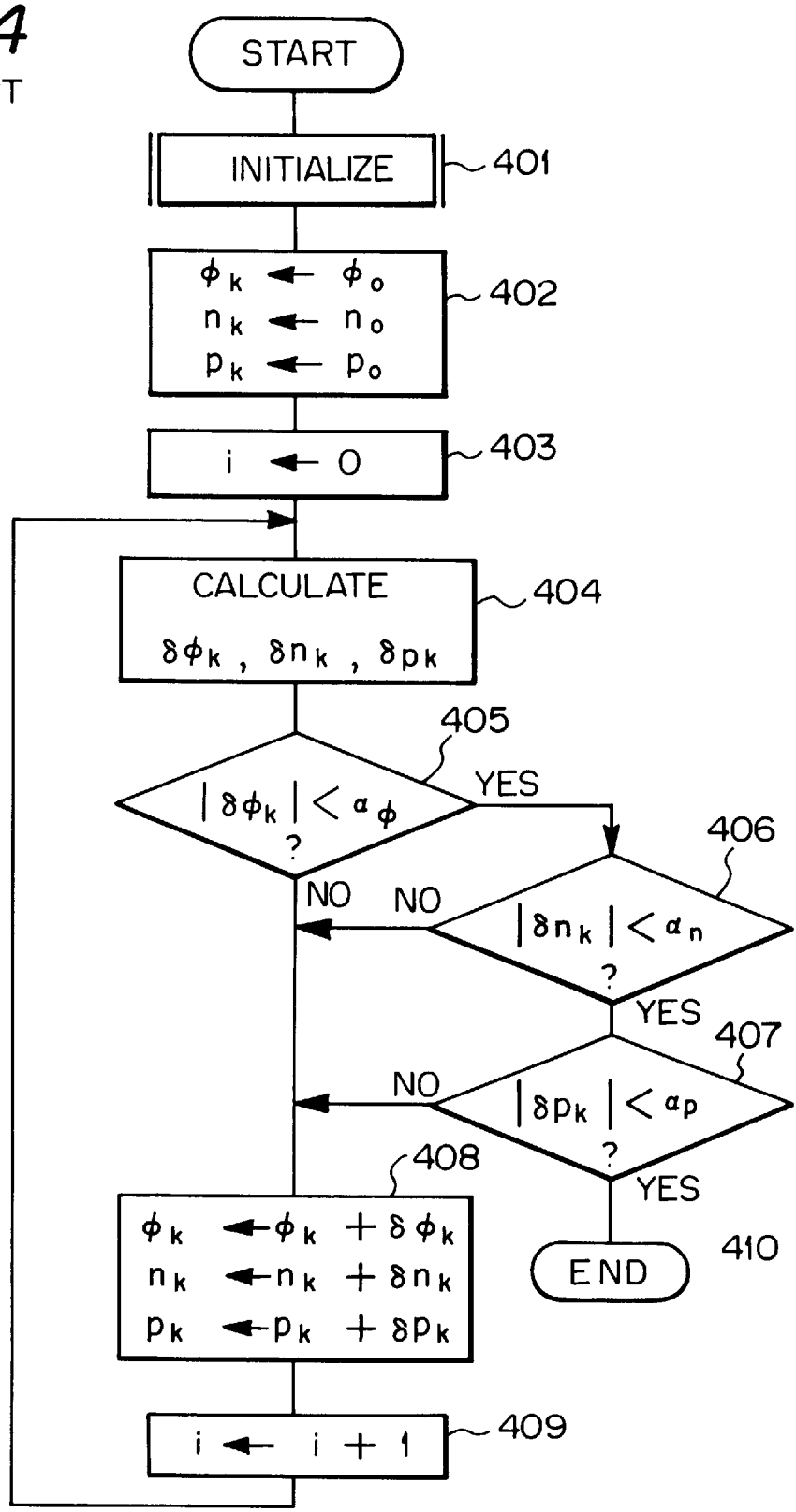
FIG. 4 is a flowchart showing a coupled solution method using the application of Newton's method as shown in FIG. 2 for the MOS transistor of FIG. 3.

A coupled solution method using Newton's method is shown in FIG. 4.

First, at step 401, an initialization is carried out to input the mesh configuration of FIG. 3, the impurity concentrations, and the 3N equations.

At step 402, the variables $\phi_1, \phi_2, \ldots, \phi_N, n_1, n_2, \ldots, n_N, p_1, p_2, \ldots, p_N$ are initialized. For example, $$\phi_1 = \phi_2 = \ldots = \phi_N = \phi_0$$

$$n_1 = n_2 = \ldots = n_N = n_0$$

$$p_1 = p_2 = \ldots = p_N = p_0$$

Also, at step 403, a value i is initialized at 0.

Next, at step 404, $\delta\phi_1, \delta\phi_2, \ldots, \delta\phi_N, \delta n_1, \delta n_2, \ldots, \delta n_N, \delta p_1, \delta p_2, \ldots, \delta p_N$ are simultaneously calculated by solving the following 3N equations:

$$\sum_{k=1}^{N} \partial F_{\phi 1}(\phi_k, n_k, p_k)/\partial \phi_k \cdot \delta\phi_k +$$

$$\sum_{k=1}^{N} \partial F_{\phi 1}(\phi_k, n_k, p_k)/\partial n_k \cdot \delta n_k +$$

$$\sum_{k=1}^{N} \partial F_{\phi 1}(\phi_k, n_k, p_k)/\partial p_k \cdot \delta p_k = -F_{\phi 1}(\phi_1, n_1, p_1)$$

$$\sum_{k=1}^{N} \partial F_{\phi 2}(\phi_k, n_k, p_k)/\partial \phi_k \cdot \delta\phi_k +$$

$$\sum_{k=1}^{N} \partial F_{\phi 2}(\phi_k, n_k, p_k)/\partial n_k \cdot \delta n_k +$$

$$\sum_{k=1}^{N} \partial F_{\phi 2}(\phi_k, n_k, p_k)/\partial p_k \cdot \delta p_k = -F_{\phi 2}(\phi_2, n_2, p_2)$$

$$\vdots$$

$$\sum_{k=1}^{N} \partial F_{\phi N}(\phi_k, n_k, p_k)/\partial \phi_k \cdot \delta\phi_k +$$

$$\sum_{k=1}^{N} \partial F_{\phi N}(\phi_k, n_k, p_k)/\partial n_k \cdot \delta n_k +$$

$$\sum_{k=1}^{N} \partial F_{\phi N}(\phi_k, n_k, p_k)/\partial p_k \cdot \delta p_k = -F_{\phi N}(\phi_N, n_N, p_N)$$

$$\sum_{k=1}^{N} \partial F_{n1}(\phi_k, n_k, p_k)/\partial \phi_k \cdot \delta\phi_k +$$

$$\sum_{k=1}^{N} \partial F_{n1}(\phi_k, n_k, p_k)/\partial n_k \cdot \delta n_k +$$

$$\sum_{k=1}^{N} \partial F_{n1}(\phi_k, n_k, p_k)/\partial p_k \cdot \delta p_k = -F_{n1}(\phi_1, n_1, p_1)$$

$$\sum_{k=1}^{N} \partial F_{n2}(\phi_k, n_k, p_k)/\partial \phi_k \cdot \delta\phi_k +$$

$$\sum_{k=1}^{N} \partial F_{n2}(\phi_k, n_k, p_k)/\partial n_k \cdot \delta n_k +$$

$$\sum_{k=1}^{N} \partial F_{n2}(\phi_k, n_k, p_k)/\partial p_k \cdot \delta p_k = -F_{n2}(\phi_2, n_2, p_2)$$

$$\vdots$$

$$\sum_{k=1}^{N} \partial F_{nN}(\phi_k, n_k, p_k)/\partial \phi_k \cdot \delta\phi_k +$$

$$\sum_{k=1}^{N} \partial F_{nN}(\phi_k, n_k, p_k)/\partial n_k \cdot \delta n_k +$$

$$\sum_{k=1}^{N} \partial F_{nN}(\phi_k, n_k, p_k)/\partial p_k \cdot \delta p_k = -F_{nN}(\phi_N, n_N, p_N)$$

$$\sum_{k=1}^{N} \partial F_{p1}(\phi_k, n_k, p_k)/\partial \phi_k \cdot \delta\phi_k +$$

$$\sum_{k=1}^{N} \partial F_{p1}(\phi_k, n_k, p_k)/\partial n_k \cdot \delta n_k +$$

$$\sum_{k=1}^{N} \partial F_{p1}(\phi_k, n_k, p_k)/\partial p_k \cdot \delta p_k = -F_{p1}(\phi_1, n_1, p_1)$$

$$\sum_{k=1}^{N} \partial F_{p2}(\phi_k, n_k, p_k)/\partial \phi_k \cdot \delta\phi_k +$$

$$\sum_{k=1}^{N} \partial F_{p2}(\phi_k, n_k, p_k)/\partial n_k \cdot \delta n_k +$$

$$\sum_{k=1}^{N} \partial F_{p2}(\phi_k, n_k, p_k)/\partial p_k \cdot \delta p_k = -F_{p2}(\phi_2, n_2, p_2)$$

$$\vdots$$

$$\sum_{k=1}^{N} \partial F_{pN}(\phi_k, n_k, p_k)/\partial \phi_k \cdot \delta\phi_k +$$

$$\sum_{k=1}^{N} \partial F_{pN}(\phi_k, n_k, p_k)/\partial n_k \cdot \delta n_k +$$

$$\sum_{k=1}^{N} \partial F_{pN}(\phi_k, n_k, p_k)/\partial p_k \cdot \delta p_k = -F_{pN}(\phi_N, n_N, p_N)$$

At step 405, it is determined whether or not $|\delta\phi_k| < \alpha_\phi$ where $\alpha_{100}$ is a (small positive value) is satisfied. In more detail, all the following conditions are satisfied:

$$|\delta\phi_1| < \alpha_\phi$$

$$|\delta\phi_2| < \alpha_\phi$$

$$\vdots$$

$$|\delta\phi_N| < \alpha_\phi$$

Only if all the conditions are satisfied, does the control proceed to step 406. Otherwise, the control proceeds directly to step 408.

At step 406, it is determined whether or not $|\delta n_k| < \alpha_n$ (where $\alpha_n$ is a small positive value) is satisfied. In more detail, all the following conditions are satisfied:

$$|\delta n_1| < \alpha_n$$

$$|\delta n_2| < \alpha_n$$

$|\delta n_N| < \alpha_n$

Only if all the conditions are satisfied, does the control proceed to step 407. Otherwise, the control proceeds directly to step 408.

At step 407, it is determined whether or not $|\delta p_k| < \alpha_p$ (where $\alpha_p$ is a small positive value) is satisfied. In more detail, all the following conditions are satisfied:

$|\delta p_1| < \alpha_p$ $|\delta p_2| < \alpha_p$

.
.
.

$|\delta p_N| < \alpha_p$

Only if all the conditions are satisfied, does the control proceed to step 410. Otherwise, the control proceeds to step 408.

At step 408, better approximations are calculated by $\phi_k \leftarrow \phi_k + \delta\phi_k$ $n_k \leftarrow n_k + \delta n_k$ $p_k \leftarrow p_k + \delta p_k$ In more detail, $\phi_1 \leftarrow \phi_1 + \delta\phi_1$ $\phi_2 \leftarrow \phi_2 + \delta\phi_2$

.
.
.

$\phi_N \leftarrow \phi_N + \delta\phi_N$ $n_1 \leftarrow n_1 + \delta n_1$ $n_2 \leftarrow n_2 + \delta n_2$

.
.
.

$n_N \leftarrow n_N + \delta n_N$ $p_1 \leftarrow p_1 + \delta p_1$ $p_2 \leftarrow p_2 + \delta p_2$

.
.
.

$p_N \leftarrow p_N + \delta p_N$

Then, at step 409, the value i is increased by 1. Then, the control at steps 404 to 409 is repeated.

Thus, best approximations $\phi_k$, $n_k$ and $p_k$ ($k=1, 2, \ldots, N$) can be obtained.

Figure 5:
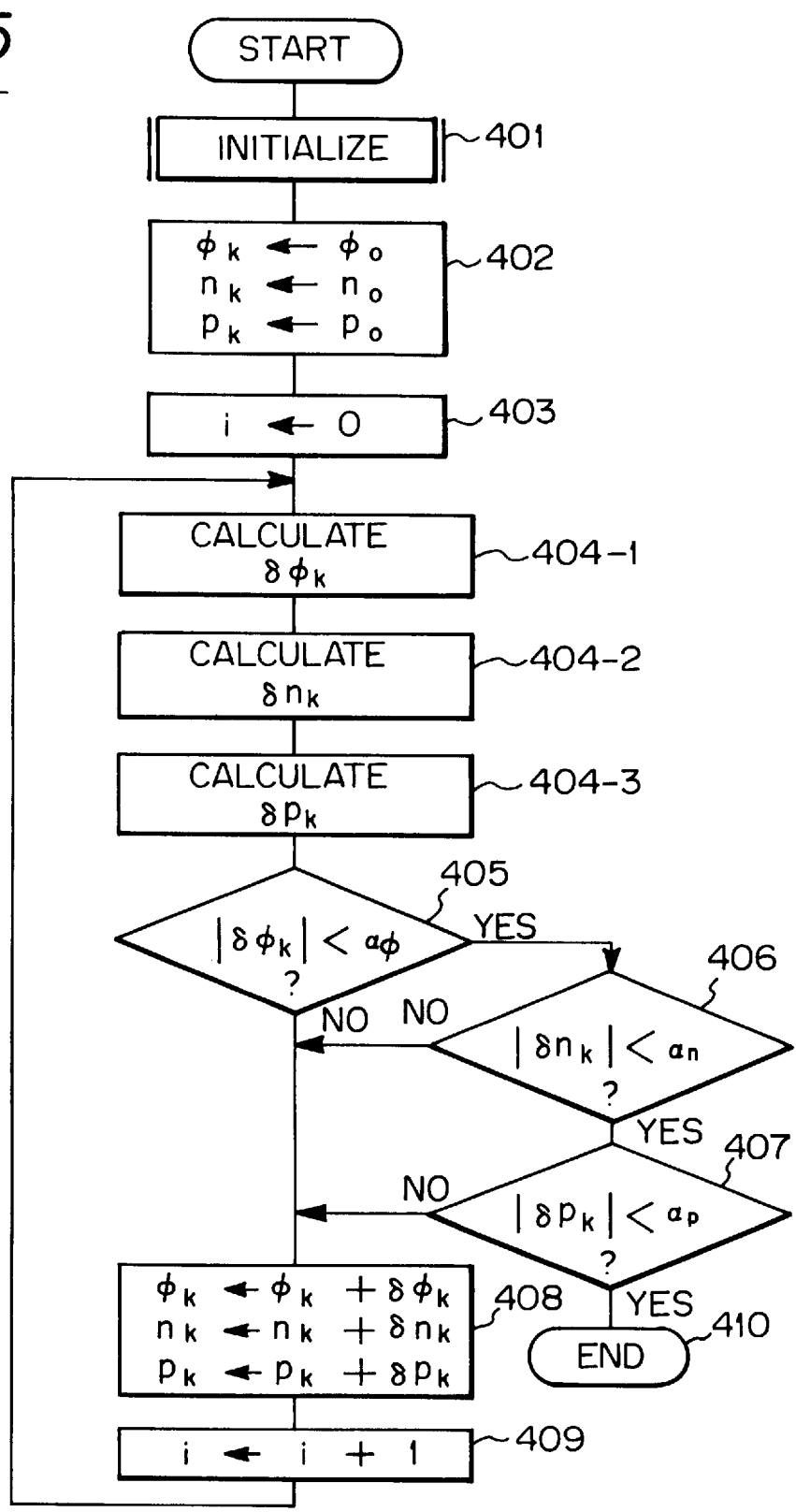
FIG. 5 is a flowchart showing a decoupled solution method using the application of Newton's method as shown in FIG. 2 for the MOS transistor of FIG. 3.

A decoupled solution method using Newton's method is shown in FIG. 5. In FIG. 5, steps 404-1, 404-2 and 404-3 are provided instead of step 404 of FIG. 4.

That is, at step 404-1, $\delta\phi_1, \delta\phi_2, \ldots, \delta\phi_N$, are simultaneously calculated by solving the following N equations:

$$\sum_{k=1}^{N} \partial F_{\phi 1}(\phi_k, n_k, p_k)/\partial \phi_k \cdot \delta\phi_k +$$

$$\sum_{k=1}^{N} \partial F_{\phi 1}(\phi_k, n_k, p_k)/\partial n_k \cdot \delta n_k +$$

$$\sum_{k=1}^{N} \partial F_{\phi 1}(\phi_k, n_k, p_k)/\partial p_k \cdot \delta p_k = -F_{\phi 1}(\phi_1, n_1, p_1)$$

$$\sum_{k=1}^{N} \partial F_{\phi 2}(\phi_k, n_k, p_k)/\partial \phi_k \cdot \delta\phi_k +$$

$$\sum_{k=1}^{N} \partial F_{\phi 2}(\phi_k, n_k, p_k)/\partial n_k \cdot \delta n_k +$$

$$\sum_{k=1}^{N} \partial F_{\phi 2}(\phi_k, n_k, p_k)/\partial p_k \cdot \delta p_k = -F_{\phi 2}(\phi_2, n_2, p_2)$$

.
.
.

$$\sum_{k=1}^{N} \partial F_{\phi N}(\phi_k, n_k, p_k)/\partial \phi_k \cdot \delta\phi_k +$$

$$\sum_{k=1}^{N} \partial F_{\phi N}(\phi_k, n_k, p_k)/\partial n_k \cdot \delta n_k +$$

$$\sum_{k=1}^{N} \partial F_{\phi N}(\phi_k, n_k, p_k)/\partial p_k \cdot \delta p_k = -F_{\phi N}(\phi_N, n_N, p_N)$$

Then at step 404-2, $\phi n_1, \phi n_2, \ldots, \phi n_N$ are simultaneously calculated by solving the following N equations:

$$\sum_{k=1}^{N} \partial F_{n1}(\phi_k, n_k, p_k)/\partial \phi_k \cdot \delta\phi_k +$$

$$\sum_{k=1}^{N} \partial F_{n1}(\phi_k, n_k, p_k)/\partial n_k \cdot \delta n_k +$$

$$\sum_{k=1}^{N} \partial F_{n1}(\phi_k, n_k, p_k)/\partial p_k \cdot \delta p_k = -F_{n1}(\phi_1, n_1, p_1)$$

$$\sum_{k=1}^{N} \partial F_{n2}(\phi_k, n_k, p_k)/\partial \phi_k \cdot \delta\phi_k +$$

$$\sum_{k=1}^{N} \partial F_{n2}(\phi_k, n_k, p_k)/\partial n_k \cdot \delta n_k +$$

$$\sum_{k=1}^{N} \partial F_{n2}(\phi_k, n_k, p_k)/\partial p_k \cdot \delta p_k = -F_{n2}(\phi_2, n_2, p_2)$$

.
.
.

$$\sum_{k=1}^{N} \partial F_{nN}(\phi_k, n_k, p_k)/\partial \phi_k \cdot \delta\phi_k +$$

$$\sum_{k=1}^{N} \partial F_{nN}(\phi_k, n_k, p_k)/\partial n_k \cdot \delta n_k +$$

$$\sum_{k=1}^{N} \partial F_{nN}(\phi_k, n_k, p_k)/\partial p_k \cdot \delta p_k = -F_{nN}(\phi_N, n_N, p_N)$$

Then at step 404-3, $\delta p_1, \delta p_2, \ldots, \delta p_N$ are simultaneously calculated by using the following N equations:

$$\sum_{k=1}^{N} \partial F_{p1}(\phi_k, n_k, p_k)/\partial\phi_k \cdot \delta\phi_k + \sum_{k=1}^{N} \partial F_{p1}(\phi_k, n_k, p_k)/\partial n_k \cdot \delta n_k +$$

$$\sum_{k=1}^{N} \partial F_{p1}(\phi_k, n_k, p_k)/\partial p_k \cdot \delta p_k = -F_{p1}(\phi_1, n_1, p_1)$$

$$\sum_{k=1}^{N} \partial F_{p2}(\phi_k, n_k, p_k)/\partial\phi_k \cdot \delta\phi_k + \sum_{k=1}^{N} \partial F_{p2}(\phi_k, n_k, p_k)/\partial n_k \cdot \delta n_k +$$

$$\sum_{k=1}^{N} \partial F_{p2}(\phi_k, n_k, p_k)/\partial p_k \cdot \delta p_k = -F_{p2}(\phi_2, n_2, p_2)$$

$$\sum_{k=1}^{N} \partial F_{pN}(\phi_k, n_k, p_k)/\partial\phi_k \cdot \delta\phi_k + \sum_{k=1}^{N} \partial F_{pN}(\phi_k, n_k, p_k)/\partial n_k \cdot \delta n_k +$$

$$\sum_{k=1}^{N} \partial F_{pN}(\phi_k, n_k, p_k)/\partial p_k \cdot \delta p_k = -F_{pN}(\phi_N, n_N, p_N)$$

In the first above-described coupled solution method, as shown in FIG. 4, if the initial values $\phi_0$, $n_0$, and $p_0$ are appropriate, the final approximations can be rapidly obtained, i.e., the final value i showing the repetition number can be small. However, if the initial values $\phi_0$, $n_0$, and $p_0$ are inappropriate, the convergence characteristics of the parameters $\phi_k$, $n_k$, and $p_k$ (k=1, 2, ..., N) are deteriorated, and, at worst, the final approximations cannot be obtained.

On the other hand, in the second above-described decoupled method as shown in FIG. 5, although the convergence characteristics of the parameters $\phi_k$, $n_k$, and $p_k$ (K=1, 2, ..., N) are not dependent upon their initial values $\phi_0$, $n_0$, and $p_0$, it takes a large number of repetitions, i.e., a large value i to converge the parameters $\phi_k$, $n_k$, and $p_k$.

In view of the foregoing, usually, the coupled solution method using Newton's method is applied as a solution method of the basic equations of semiconductor transport.

However, the basic equations of semiconductor transport have strong nonlinearity. Therefore, if the approximations of the parameters greatly fluctuate, the approximations are so oscillated that it is impossible to converge the approximations. At worst, it is impossible to obtain final solutions.

In order to avoid the difficulty of the convergence of the approximations of the basic equations, when the absolute values of the deviations $\delta\phi_k$, $\delta n_k$, and $\delta p_k$ are larger than a certain upper limit, such deviations are multiplied by a damping factor, thus repeating the calculation of the parameters (see: Osman Ersed Akcasu, "Convergence Properties of Newton's Method for the Solution of the Semiconductor Transport Equations and Hybrid Solution Techniques for Multidimensional Simulation of VLSI Devices," Solid-State Electronics, Vol. 27, No. 4 pp.319–328, 1984; Andrea F. Franz, et al., "BAMBI-A Design Model for Power MOSFET'S", IEEE Transactions on Computer-Aided Design, Vol. CAD-4, No. 3, pp. 177–189, July 1985; and Randolph E. Bank, et al. "Transient Simulation of Silicon Devices and Circuits," IEEE Transactions on Electron Devices, Vol. ED-32, No. 10, pp. 1992–2007, October 1985).

In the above-described modified Newton's method (i.e., the damping factor modification), since the nonlinearity of the basic equations is not uniform in a simulation region. Therefore, if the upper limit is set to respond to the solutions in a weak nonlinearity region, it is difficult to converge the parameters in a strong nonlinearity region. On the contrary, if the upper limit is set to respond to the solutions in the strong nonlinearity region, the convergence characteristics of the parameters in the weak nonlinearity region are deteriorated. This deterioration increases the number of repetitions, and thereby increases the calculation time.

Figure 6:
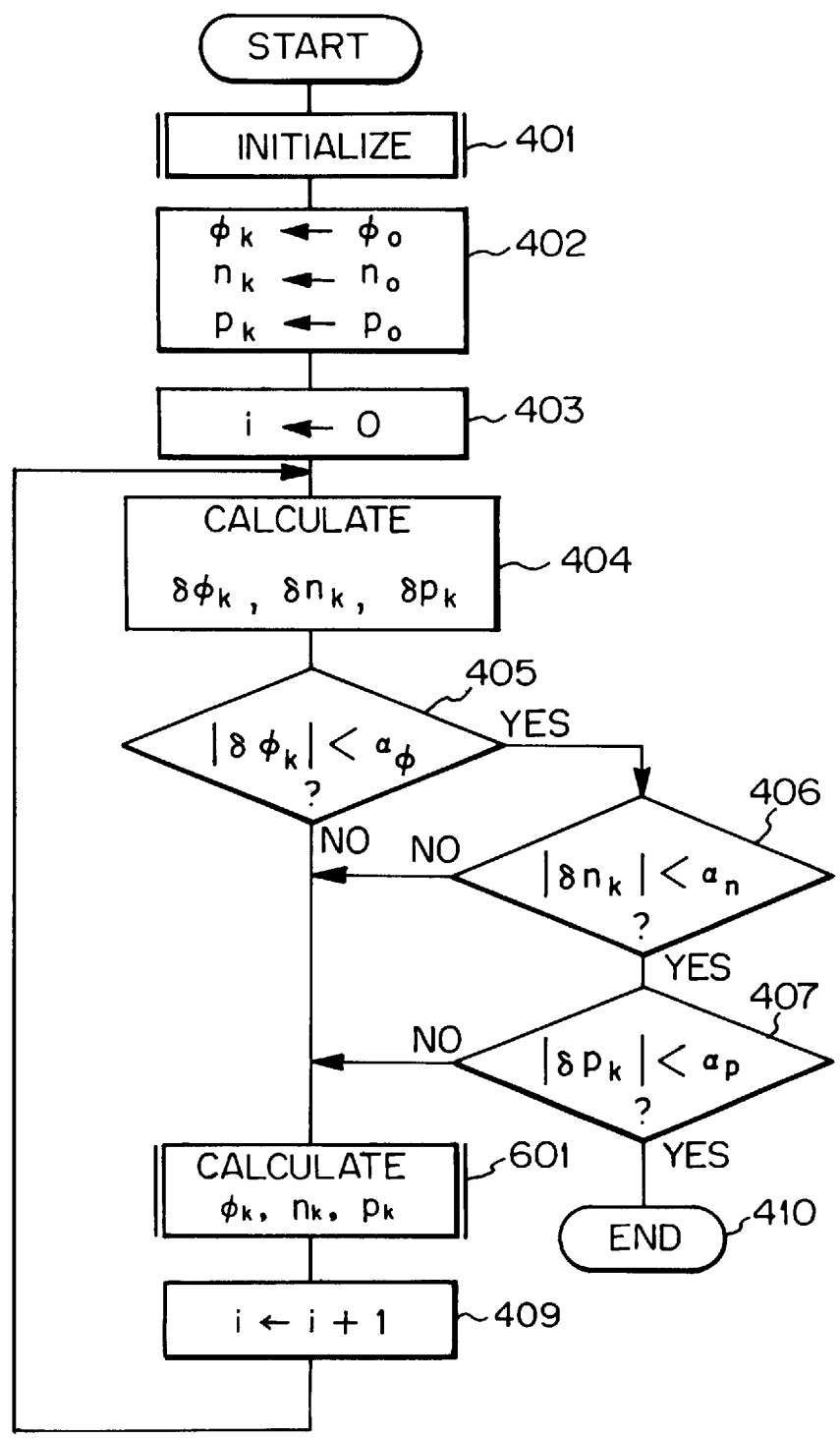
FIG. 6 is a flowchart showing an embodiment of the simulating method according to the present invention.

In FIG. 6, which shows an embodiment of the present invention, step 408 of FIG. 4 is replaced by step 601.

Figure 7A:
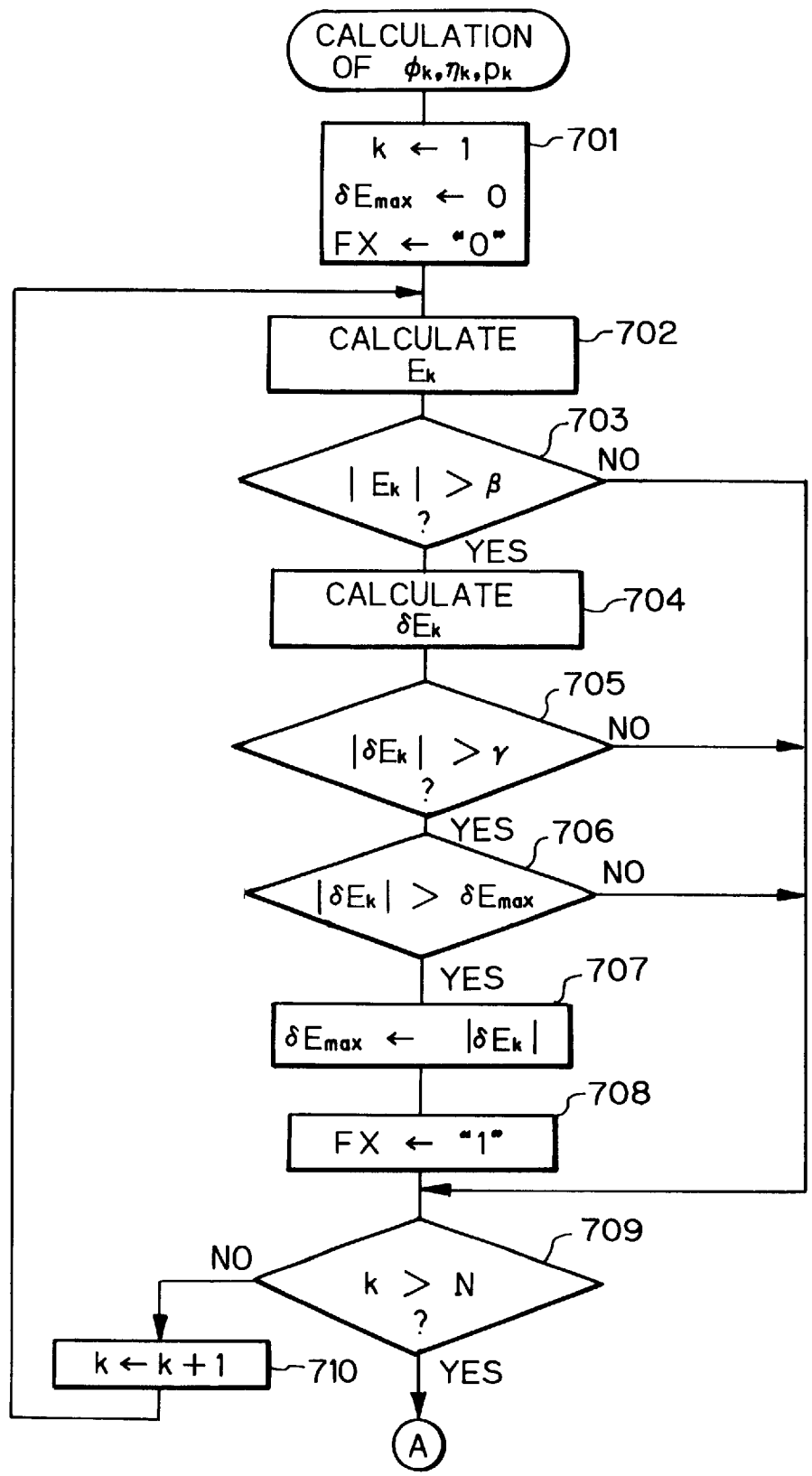
FIGS. 7A and 7B are a detailed flowchart of step 601 of FIG. 6.
Figure 7B:
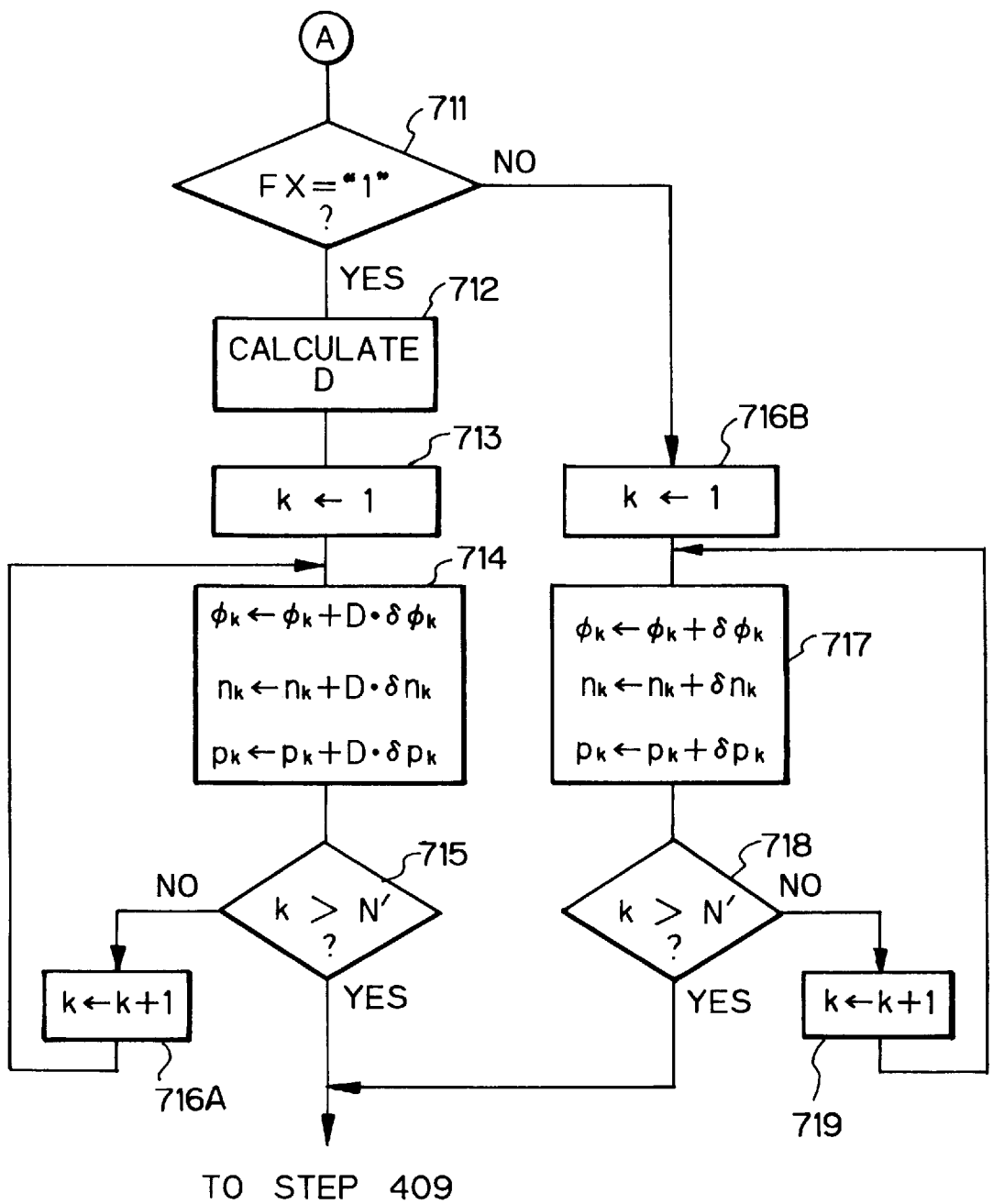

The parameters $\phi_k$, $n_k$ and $p_k$ (k=1, 2, ..., N) is calculated at step 601 which are shown in detail in FIGS. 7A and 7B.

Referring to FIGS. 7A and 7B, at step 701, an initialization is carried out. That is, the value k is initialized (i.e., set) at 1, δEmax is made (i.e., set at) 0, and a flag FX is reset (i.e., set at) (FX="0").

Next, at step 702, an electric field $E_k$ for an edge connecting two nodes k and k' is calculated by $$E_k \leftarrow (\phi_k - \phi_{k'})/d_K$$

where $\phi_{k'}$ is a potential at node k' adjacent to node k; and $d_k$ is a distance between node k and node k'.

Next, at step 703, it is determined whether or not $|E_k|>\beta$ (B is a definite value) is satisfied. Only if $|E_k|>\beta$, does the control proceed to step 704. Otherwise, the control proceeds to step 709.

At step 704, a derivative $\delta E_K$ of the electric field $E_k$ is calculated by $$\delta E_k = E_k - E_{k0}$$

where $E_{k0}$ is a previous value of the electric field $E_k$. Note that, if $E_k$ is calculated based upon the initial value $\phi_0$, $\delta E_k$ is caused to be 0.

Next, at step 705, it is determined whether or not $|\delta E_k|>\tau$ (where it is a definite value) is satisfied. Only if $|\delta E_k|>\tau$, does the control proceed to step 706. Otherwise, the control proceeds to step 709.

At step 706, it is determined whether or not $|\delta E_k|>\delta$Emax is satisfied. Only if $|\delta E_k|>\delta$Emax, does the control proceed to steps 707 and 708. Otherwise, the control proceeds to step 709.

At step 707, δEmax is renewed by $|\delta E_k|$, and at step 708, the flag FX is set (FX="1").

The control at steps 702 to 708 is repeated after steps 709 and 710 until k reaches N where N is a number of edges within the simulation region.

Next, at step 711, it is determined whether or not FX="1" is satisfied. If FX="1", the control proceeds to steps 712 through 716A. If FX="0", the control proceeds to steps 716B through 719.

At step 712, a damping factor D is calculated by $$D = \tau/\delta E\max < 1$$

Next, at step 713, the value k is reset at 1.
Next, at step 714, $\phi_k$, $n_k$, and $p_k$ are calculated by $$\phi_k \leftarrow \phi_k + D \cdot \delta\phi_k$$

$$n_k \leftarrow n_k + D \cdot \delta n_k$$

$$p_k \leftarrow p_k + D \cdot \delta p_k$$

The control at step 714 is repeated through steps 715 and 716A until k reaches N', where N' is a number of nodes in the simulation region.

However, if FX="0", then the control proceeds to 716B. At 716B, K is reset at 1.

Next, at step 717, $\phi_k$, $n_k$, and $p_k$ are calculated by $$\phi_k \leftarrow \phi_k + \delta\phi_k$$

$$n_k \leftarrow n_k + \delta n_k$$

$$p_k \leftarrow p_k + \delta p_k$$

The control at step 717 is repeated after steps 718 and 719 until k reaches N'.

Figure 8A:
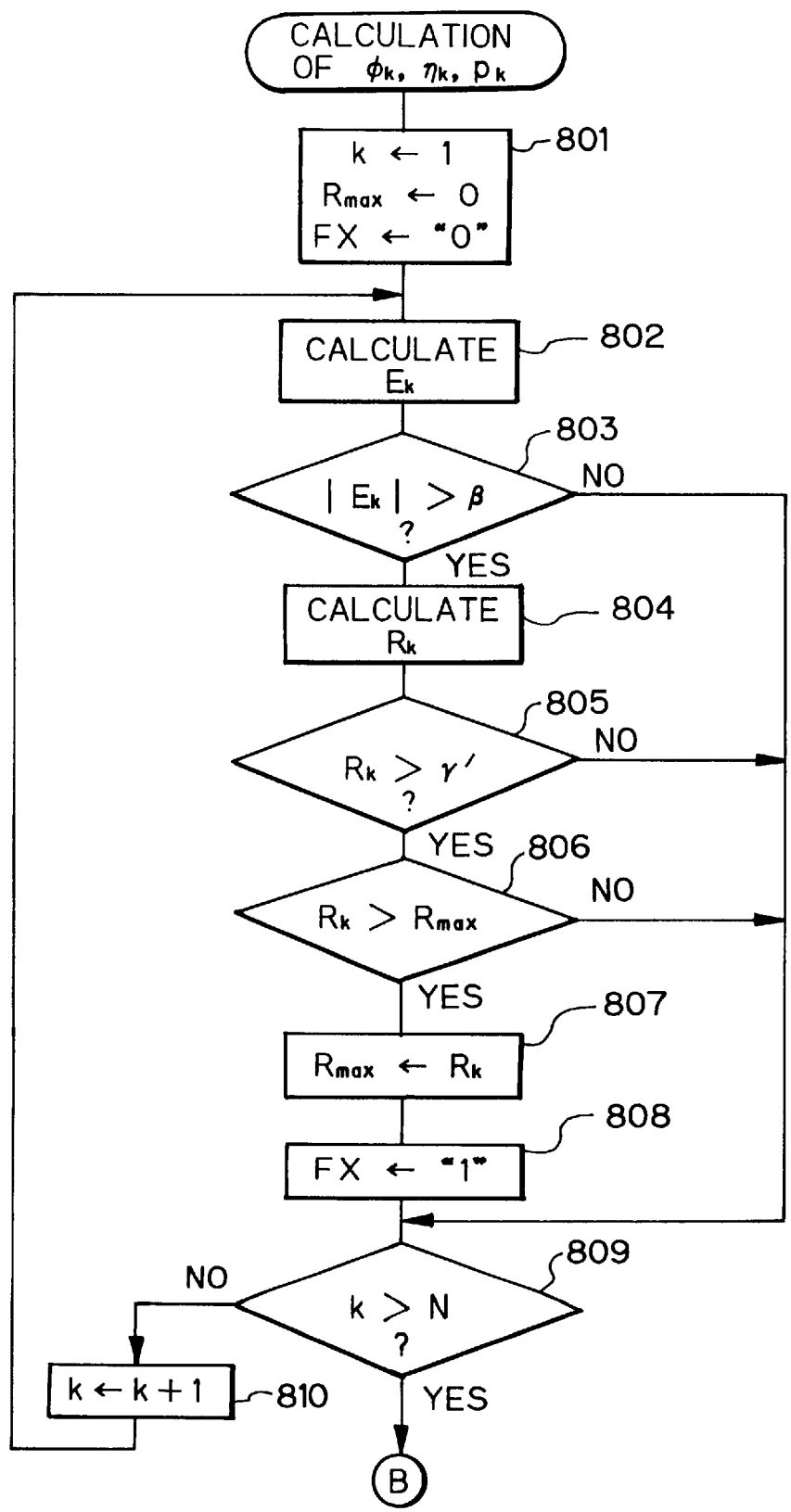
FIGS. 8A and 8B are a flowchart of a modification of FIG. 7.
Figure 8B:
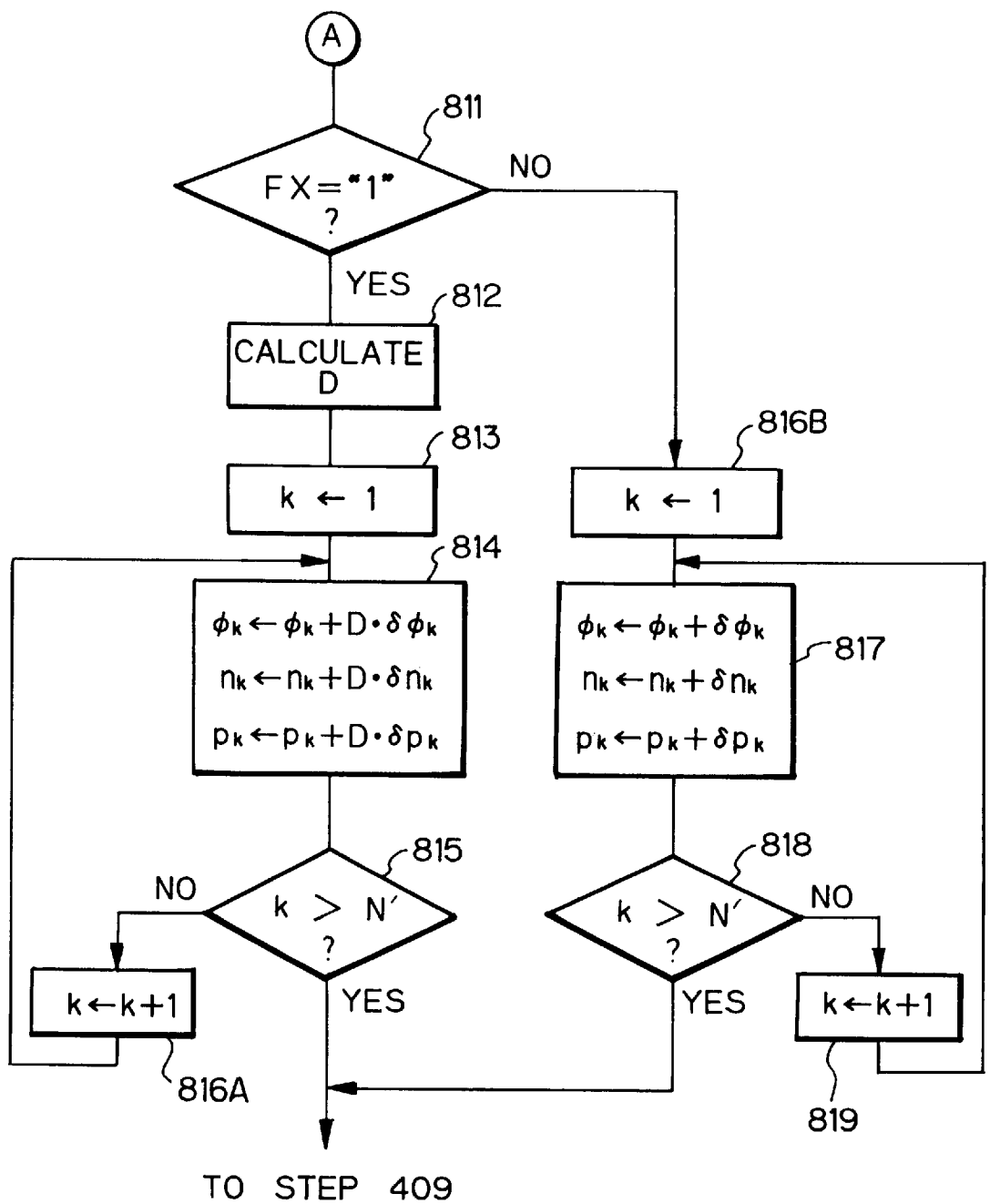

FIGS. 8A and 8B are a modification of the routine of FIGS. 7A and 7B.

Referring to FIGS. 8A and 8B, at step 801, an initialization is carried out. That is, the value k is initialized at 1, Rmax is made 0, and a flag FX is reset (FX="0").

Next, at step 802, an electric field $E_k$ for an edge connecting two nodes k and k' is calculated by $$E_k \leftarrow (\phi_k - \phi_{k'})/d_k$$

where $\phi_{k'}$ is a potential at node k' adjacent to node k; and $d_k$ is a distance between node k and node k'.

Next, at step 803, it is determined whether or not $|E_k| > \beta$ (where B is a definite value) is satisfied. Only if $|E_k| > \beta$, does the control proceed to step 804. Otherwise, the control proceeds to step 809.

That is, at step 804, a ratio $R_k$ of the electric field $E_k$ to its previous value $E_{k0}$ is calculated by $$R_k = E_k / E_{k0}$$

Note that, if $E_k$ is calculated based upon the initial value $\phi_0$, $R_k$ is caused to be 1.

Next, at step 805, it is determined whether or not $|R_k| > \tau'$ (where $\tau'$ is a definite value) is satisfied. Only if $|R_k| > \tau'$, does the control proceed to step 806. Otherwise, the control proceeds to step 809.

At step 806, it is determined whether or not $|R_k| > Rmax$ is satisfied. Only if $|R_k| > Rmax$, does the control proceed to steps 807 and 808. Otherwise, the control proceeds to step 809.

At step 807, Rmax is renewed by $R_k$, and at step 808, the flag FX is set (FX="1").

The control at step 802 to 808 is repeated after steps 809 and 810 until k reaches N, where N is a number of edges within the simulation region.

Next, at step 811, it is determined whether or not FX="1" is satisfied. If FX="1", the control proceeds to steps 812 through 816A. If FX="0", the control proceeds to steps 816B through 819.

At step 812, a damping factor D is calculated by $$D = (\gamma' - 1)/Rmax - 1)c1$$

Next, at step 813, the value k is reset at 1.
Next, at step 814, $\phi_k$, $n_k$, and $p_k$ are calculated by $$\phi_k \leftarrow \phi_k + D \cdot \delta \phi_k$$

$$n_k \leftarrow n_k + D \cdot \delta n_k$$

$$p_k \leftarrow p_k + D \cdot \delta p_k$$

The control at step 814 is repeated after steps 815 and 816A until k reaches N', where N' is a number of nodes in the simulation region.

However, if FX="0", then the control proceeds to 816B. At 816B, k is reset at 1.

Next, at step 817, $\phi_k$, $n_k$, and $p_k$ are calculated by $$\phi_k \leftarrow \phi_k + \delta \phi_k$$

$$n_k \leftarrow n_k + \delta n_k$$

$$p_k \leftarrow p_k + \delta p_k$$

The control at step 817 is repeated after steps 818 and 819 until k reaches N'.

Figure 9:
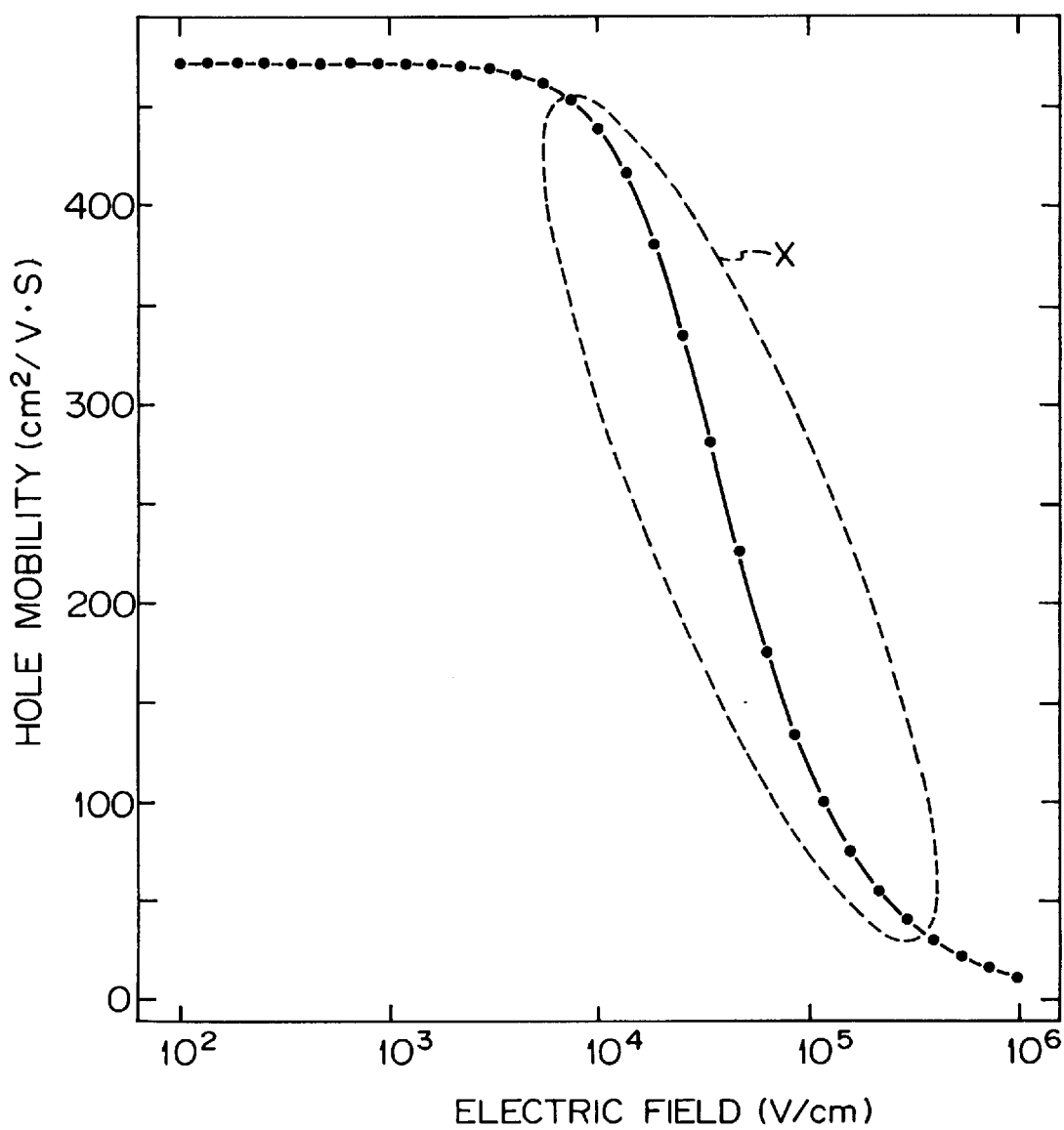
FIG. 9 is a graph showing a relationship between an electric field and a hole mobility in a semiconductor device.

The nonlinearity characteristics of the basic equation of semiconductor transport is based upon the dependency of the mobility upon the electric field as shown in FIG. 9, which is known as a Scharfetter and Gummel mobility model. That is, when the electric field is larger than $1.0 \times 10^4$ V/cm, e.g., as indicated by the region labeled X in FIG. 9, the mobility is remarkably reduced to show a strong nonlinearity. In such a region, even a small fluctuation of the electric field greatly fluctuates the mobility. Therefore, since the current equations include the mobilities as parameters, the approximations greatly fluctuate, so that, at worst, the convergence of the parameters cannot be obtained.

In the present invention, Newton's method is modified for use on such a region X. The conventional Newton's method is applied to the remaining regions of FIG. 9 that are not included in region X.

The operation as shown in FIGS. 8A and 8B is advantageous over that as shown in FIGS. 7A and 7B, because a damping factor applying region can be larger in FIGS. 8A and 8B than in FIGS. 7A and 7B.

Figure 10:
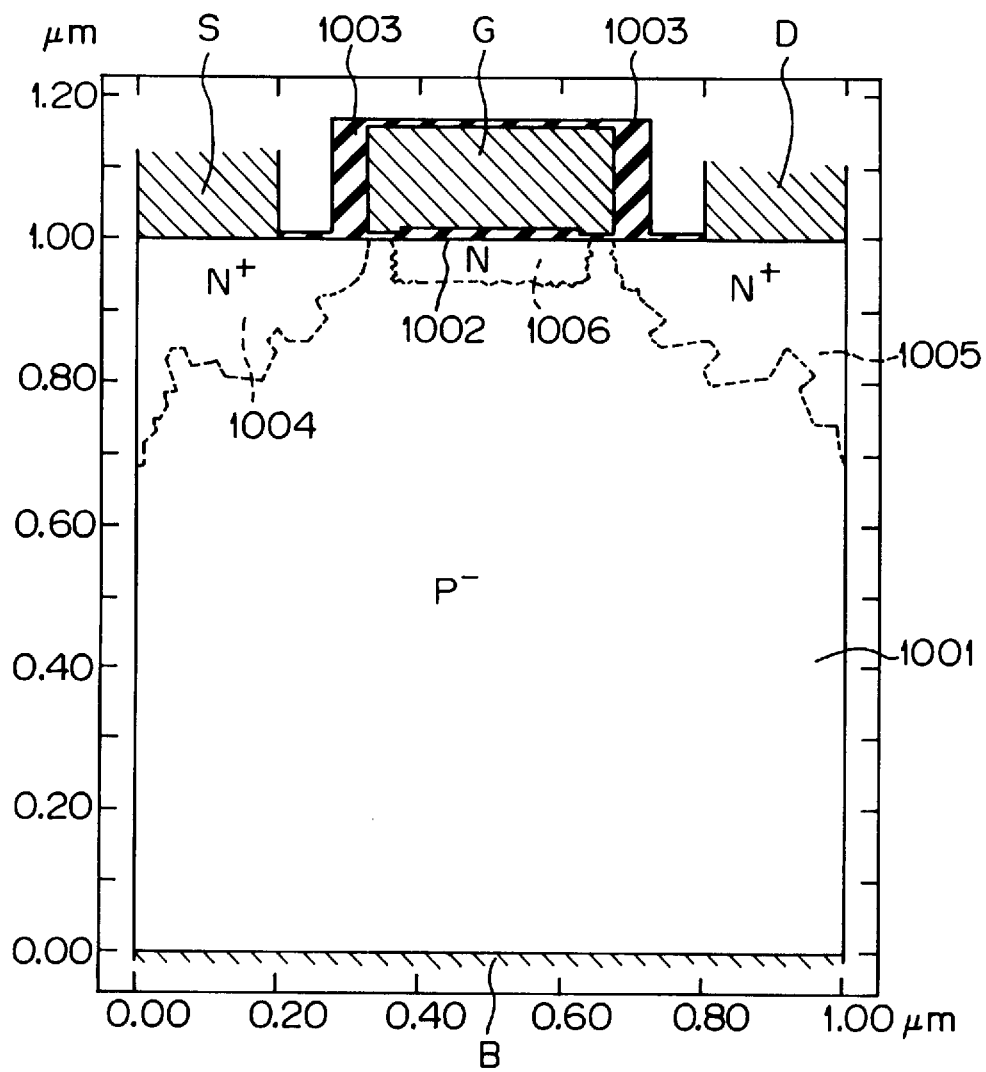
FIG. 10 is a cross-sectional view illustrating a MOS transistor to which the operation of FIGS. 6, 8A and 8B is applied.
Figure 11:
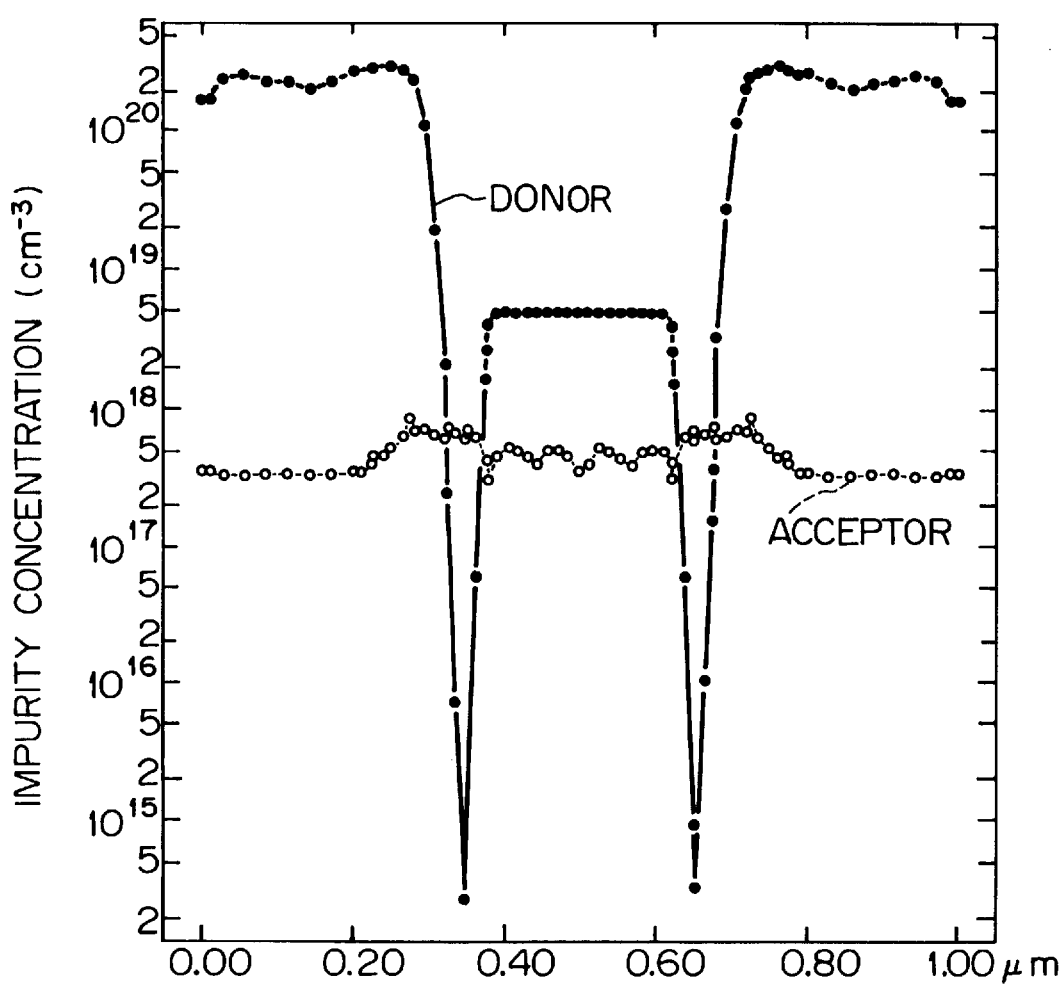
FIG. 11 is a graph showing impurity concentrations of the substrate of FIG. 10 near the surface thereof.
Figure 12:
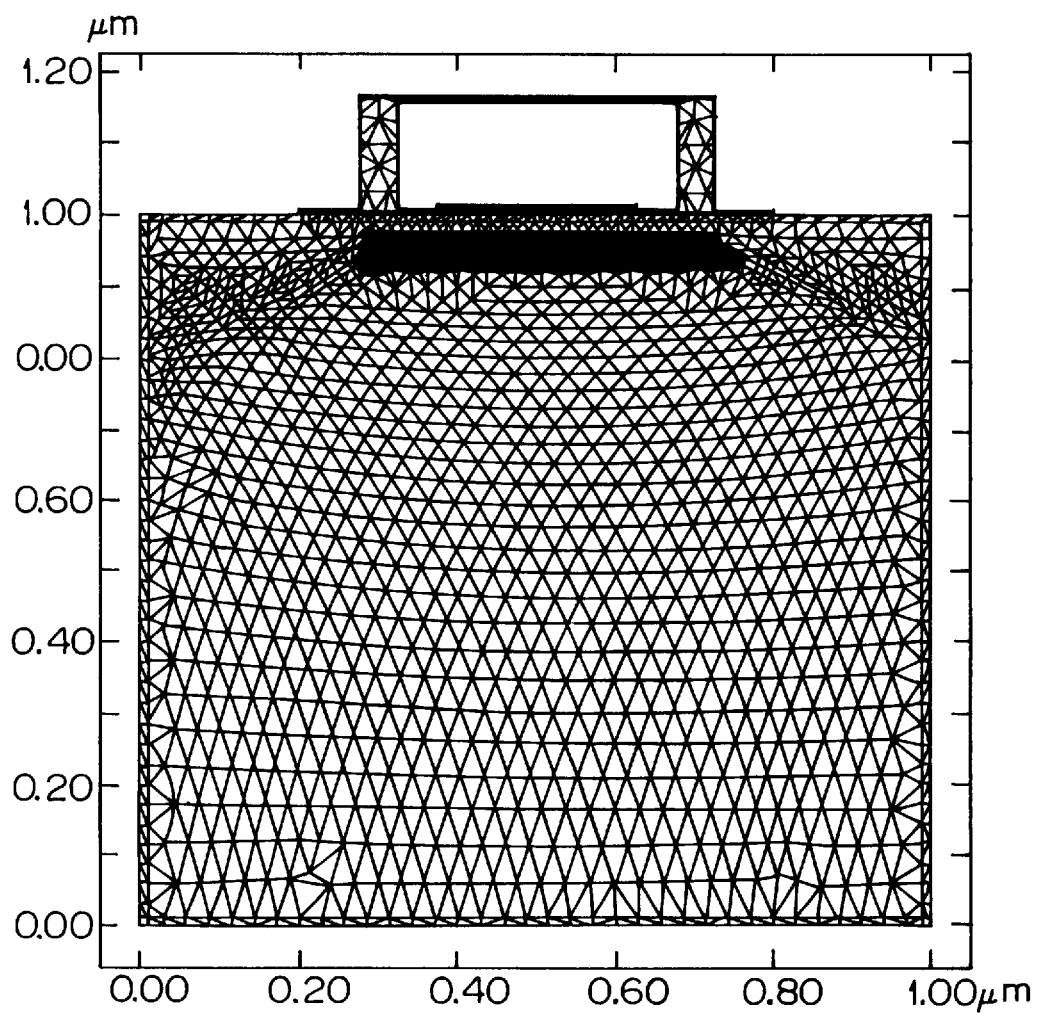
FIG. 12 is a diagram showing a mesh provided in the transistor of FIG. 10.

The operation as shown in FIGS. 6, 8A and 8B is applied to an LDD MOS transistor example as illustrated in FIGS. 10, 11 and 12.

FIG. 10 is a cross-sectional view of the MOS transistor. In FIG. 10, there is a $P^-$-type monocrystalline silicon substrate 1001 on which a gate electrode G is formed via a gate silicon oxide layer 1002. The gate electrode G is covered by a sidewall silicon oxide layer 1003. Also, a source electrode S and a drain electrode D are formed on the substrate 1001. An $N^+$-type source region 1004 is formed beneath the source electrode S within the substrate 1001, and an $N^+$-type drain region 1005 is formed beneath the drain electrode D within the substrate 1001. Also, an N-type channel doped region 1006 is formed beneath the gate electrode G within the substrate 1001.

Figure 13:
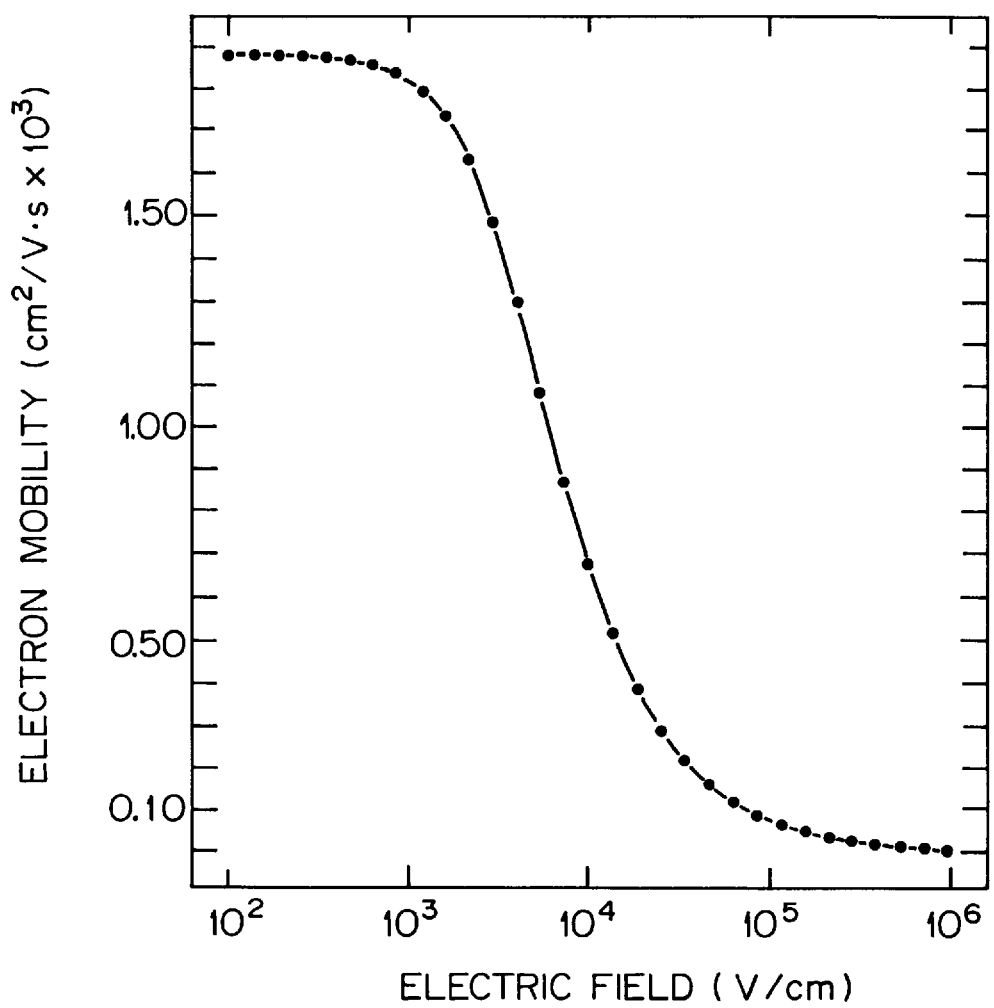
FIG. 13 is a graph showing an electron mobility model used in the operation of FIGS. 6, 8A and 8B.
Figure 14:
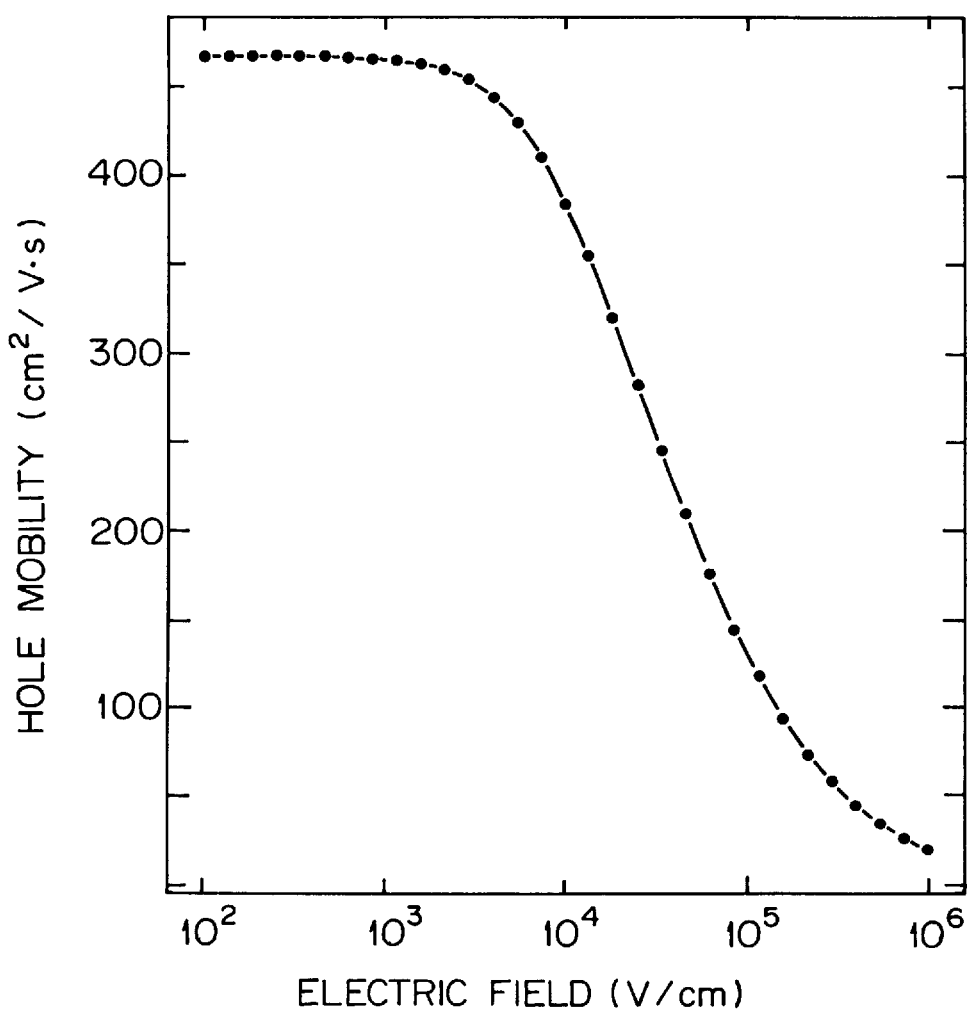
FIG. 14 is a graph showing a hole mobility model used in the operation of FIGS. 6, 8A and 8B.

Impurity concentrations of the substrate 1001 of FIG. 10, near the surface thereof, are shown in FIG. 11. A mesh provided in the MOS transistor of FIG. 10 is shown in FIG. 12. Further, an electron mobility model and a hole mobility model used in the operation of FIGS. 6, 8A and 8B are shown in FIGS. 13 and 14.

Figure 15:
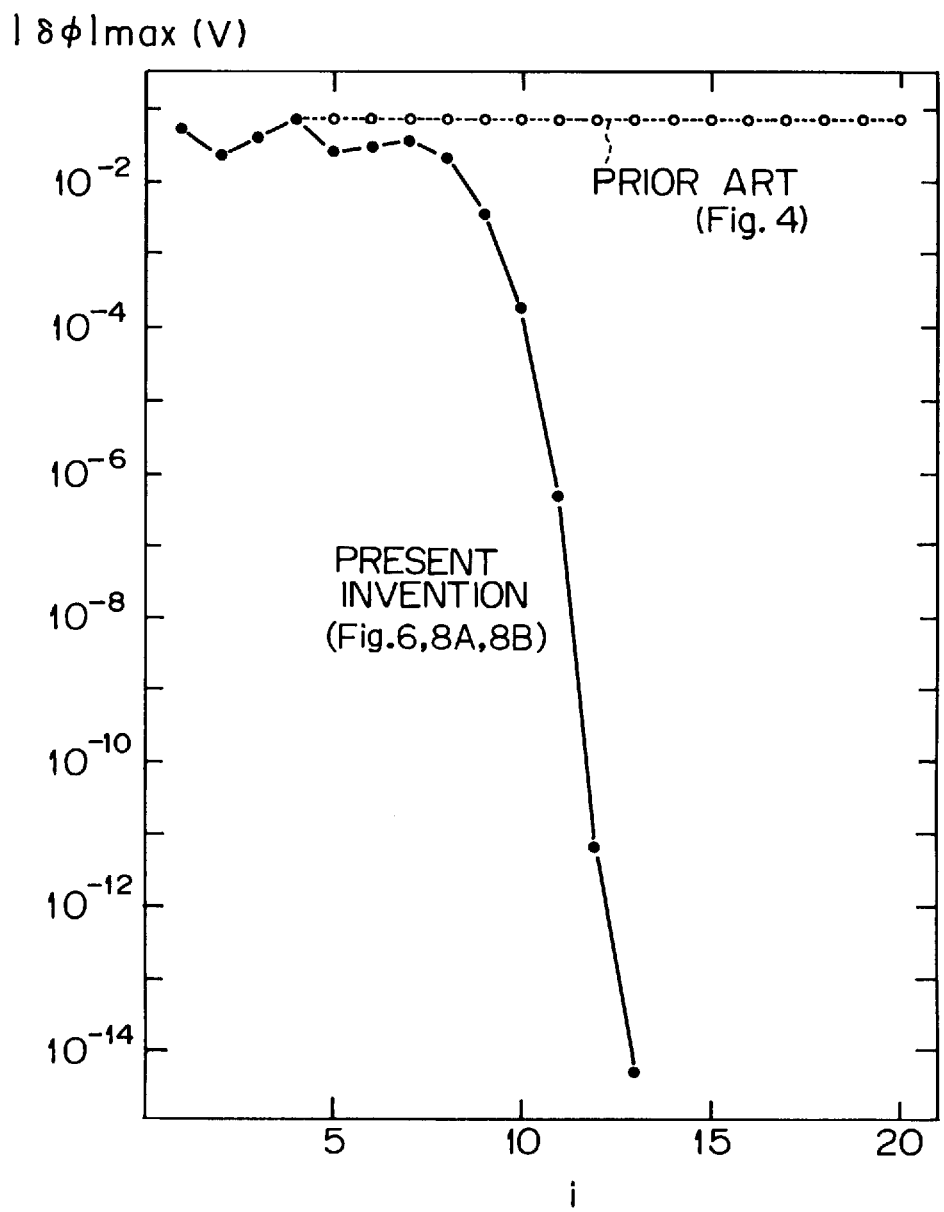
FIG. 15 is a graph showing the convergence characteristics of the MOS transistor of FIG. 10.
Figure 16:
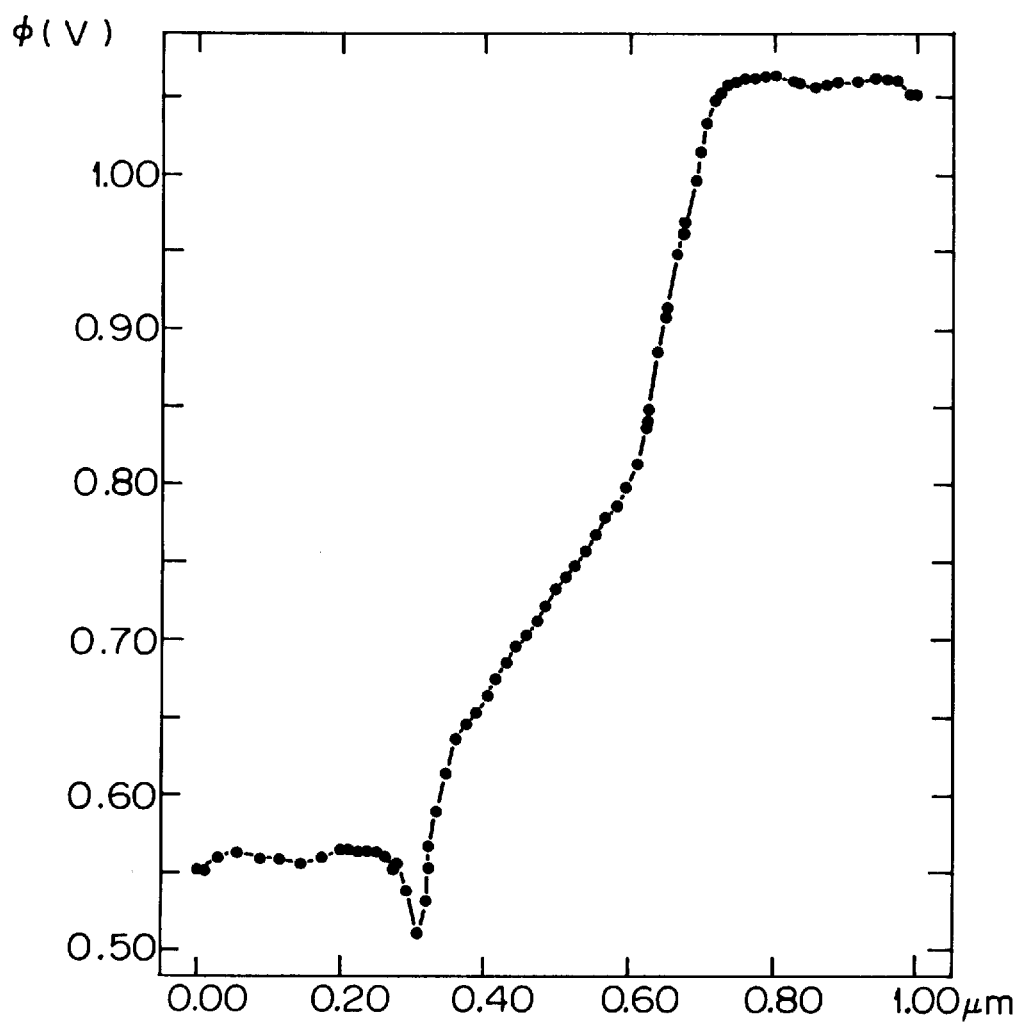
FIG. 16 is a graph showing a final potential obtained in the MOS transistor of FIG. 10.
Figure 17:
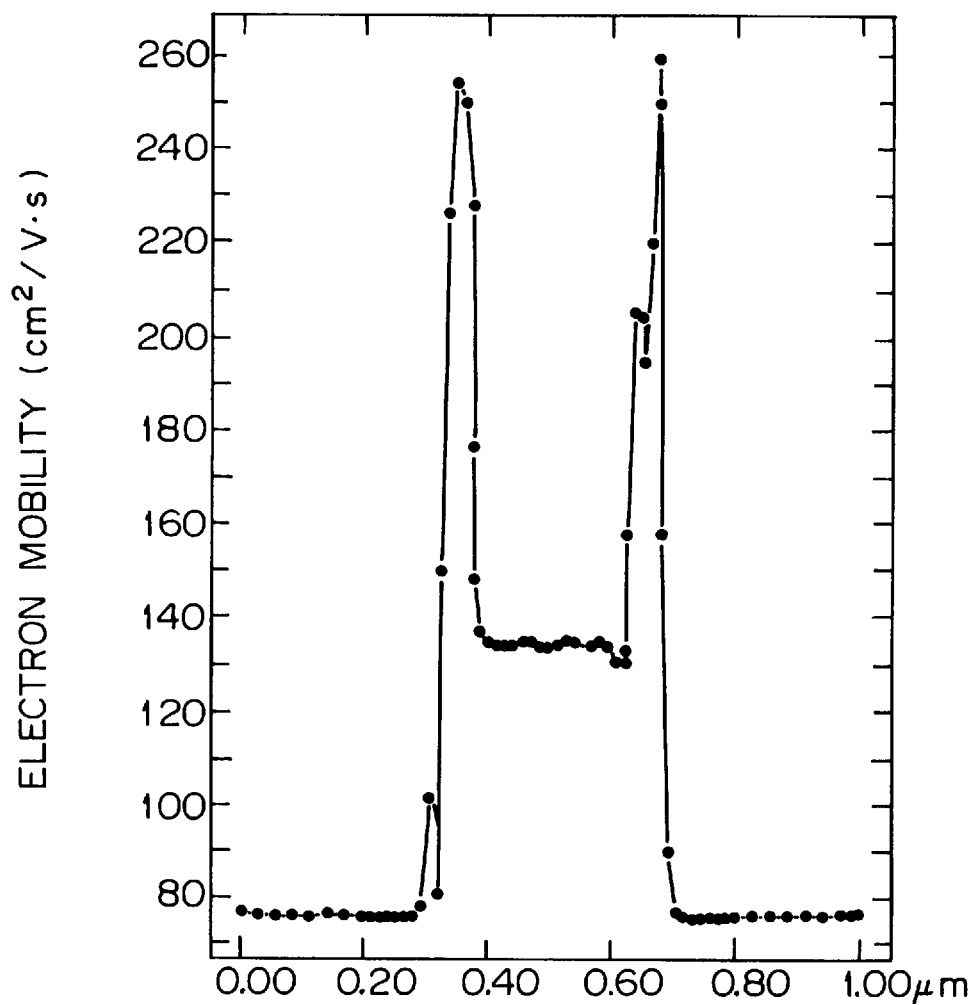
FIG. 17 is a graph showing a final electron mobility obtained in the MOS transistor of FIG. 10.

The other conditions for the simulating operation are as follows. Initially, a voltage of 0V is applied to the source electrode S, a voltage of 1.5V is applied to the gate electrode G, a voltage of 0.5V is applied to the drain electrode D, and a voltage of 0V is applied to the electrode B of the substrate 1001. Then, the voltage applied to the gate electrode G is changed from 1.5V to 2.0V. In this case, the convergence characteristics that are represented by a maximum value of an absolute value of the potential fluctuation $\delta \phi$, is remarkably improved. Referring to the comparison in FIG. 15, here, $\beta$ is $1.0 \times 10^4$ V/cm and $\tau'$ is 3, for the method of FIGS. 6, 8A and 8B, while, in comparison $\alpha$ is 0.075V for the prior art method of FIG. 4. Also, a final potential $\phi$ and a final electron mobility of the substrate 1001 near the surface are obtained as shown in FIGS. 16 and 17.

Figure 18:
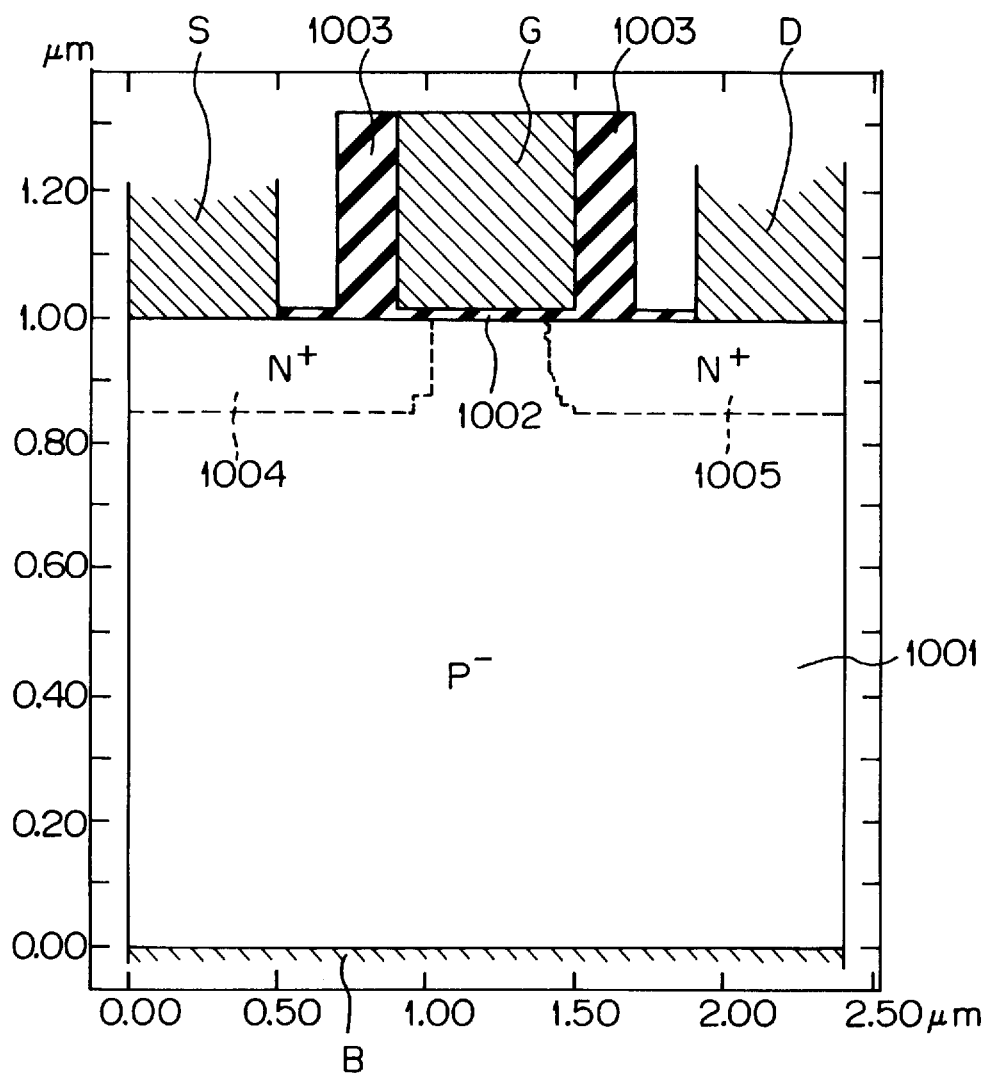
FIG. 18 is a cross-sectional view illustrating another MOS transistor to which the operation of FIGS. 6, 8A and 8B is applied.
Figure 19:
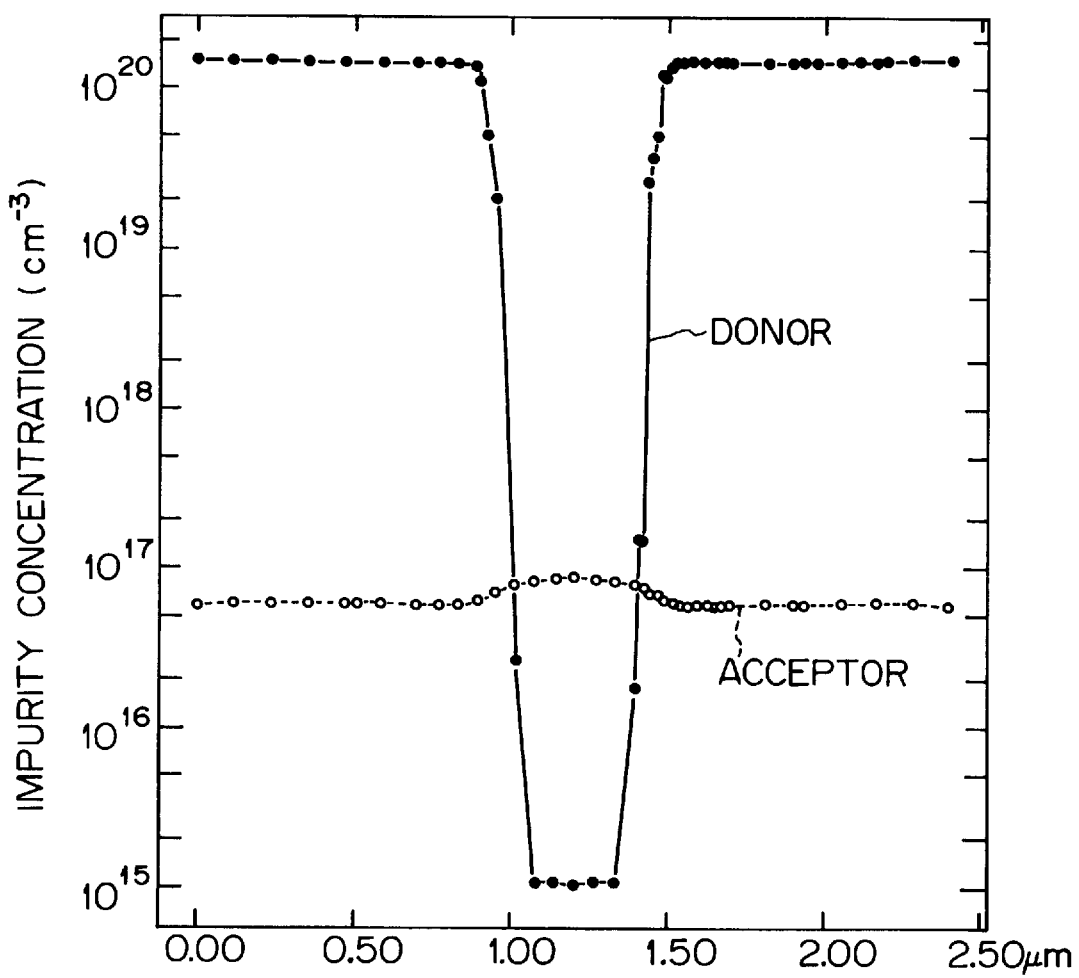
FIG. 19 is a graph showing impurity concentrations of the substrate of FIG. 18 near the surface thereof.
Figure 20:
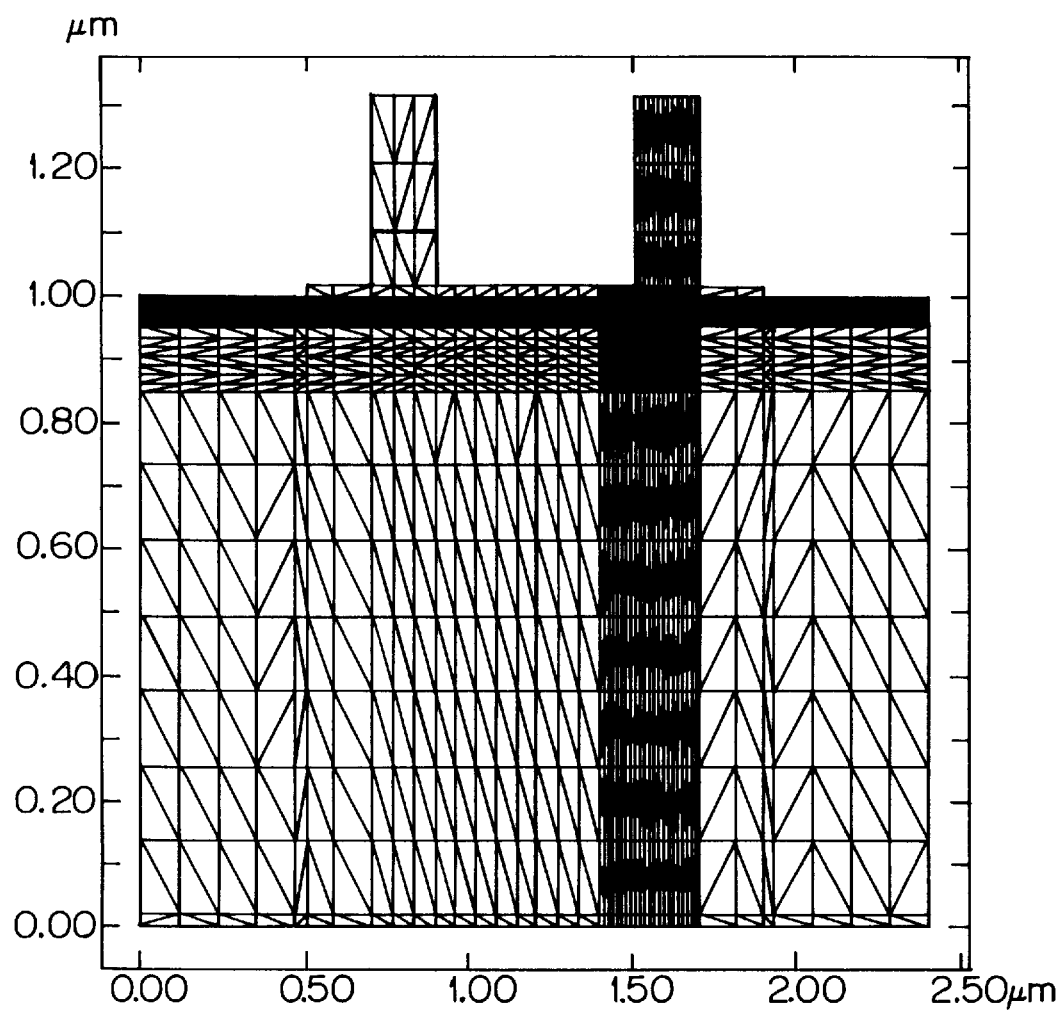
FIG. 20 is a diagram showing a mesh provided in the transistor of FIG. 18.

The operation (i.e., method) as shown in FIGS. 6, 8A and 8B is applied to another (i.e., second) LDD MOS transistor example as illustrated in FIGS. 18, 19 and 20.

In FIG. 18, which is a cross-sectional view of the second MOS transistor, the N-type channel doped region 1006 of FIG. 10 is not provided. Impurity concentrations of the substrate 1001 of FIG. 18 near the surface thereof are shown in FIG. 19. A mesh provided in the MOS transistor of FIG. 18 is shown in FIG. 20. Further, in this case, an electron mobility model and a hole mobility model as shown in FIGS. 13 and 14 are used in the operation of FIGS. 6, 8A and 8B. Also, the following local impact ionization model is used for the rate of generation of electron-hole pairs:

$$G^{ION} = \frac{1}{q} (k_n|\vec{J_n}| + k_p|\vec{J_p}|)$$

$$k_n = f(N, E_n) \cdot EAGRN \cdot \exp\left(-\frac{EBGRN \cdot |\vec{J_n}|}{\vec{E} \cdot \vec{J_n}}\right)$$

$$f(N, E_n) = \exp\left(-\frac{N}{CE}\right) / \left[1 + \exp\left(\frac{EEI - E_n}{kT}\right)\right]$$

$$E_n - \int_x^{ETERM} \frac{\vec{E} \cdot \vec{J_n}}{|\vec{J_n}|} dL$$

$$k_n = f(N, E_p) \cdot HAGRN \cdot \exp\left(-\frac{HBGRN \cdot |\vec{J_p}|}{\vec{E} \cdot \vec{J_p}}\right)$$

$$f(N, E_p) = \exp\left(-\frac{N}{CH}\right) / \left[1 + \exp\left(\frac{HEI - E_p}{kT}\right)\right]$$

$$E_p - \int_x^{HTERM} \frac{\vec{E} \cdot \vec{J_p}}{|\vec{J_p}|} dL$$

where ETREM and HTERM are reference terminal coordinates of electrons and holes;

EAGRN, EBGRN, EEI, CE, HAGRN, HBGRN, HEI and CH are constants (see: Syunsyke Baba, et al., "Study of Carrier Generation Model in MOSFE for Device Simulation Program," The Institute of Electronics & Communication Engineers, SSD84-70, pp. 45–52, 1984).

Figure 21:
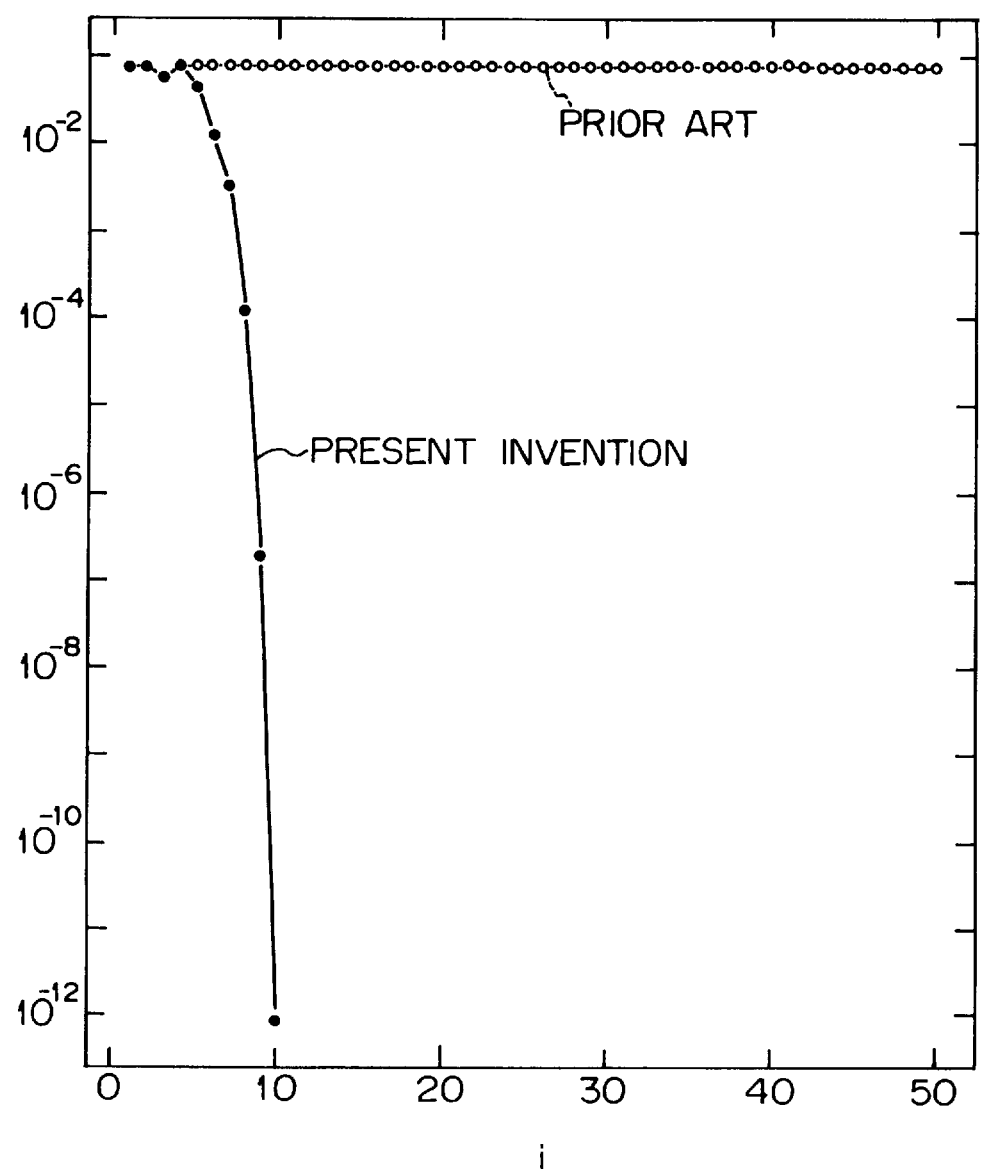
FIG. 21 is a graph showing the convergence characteristics of the MOS transistor of FIG. 18.
Figure 22:
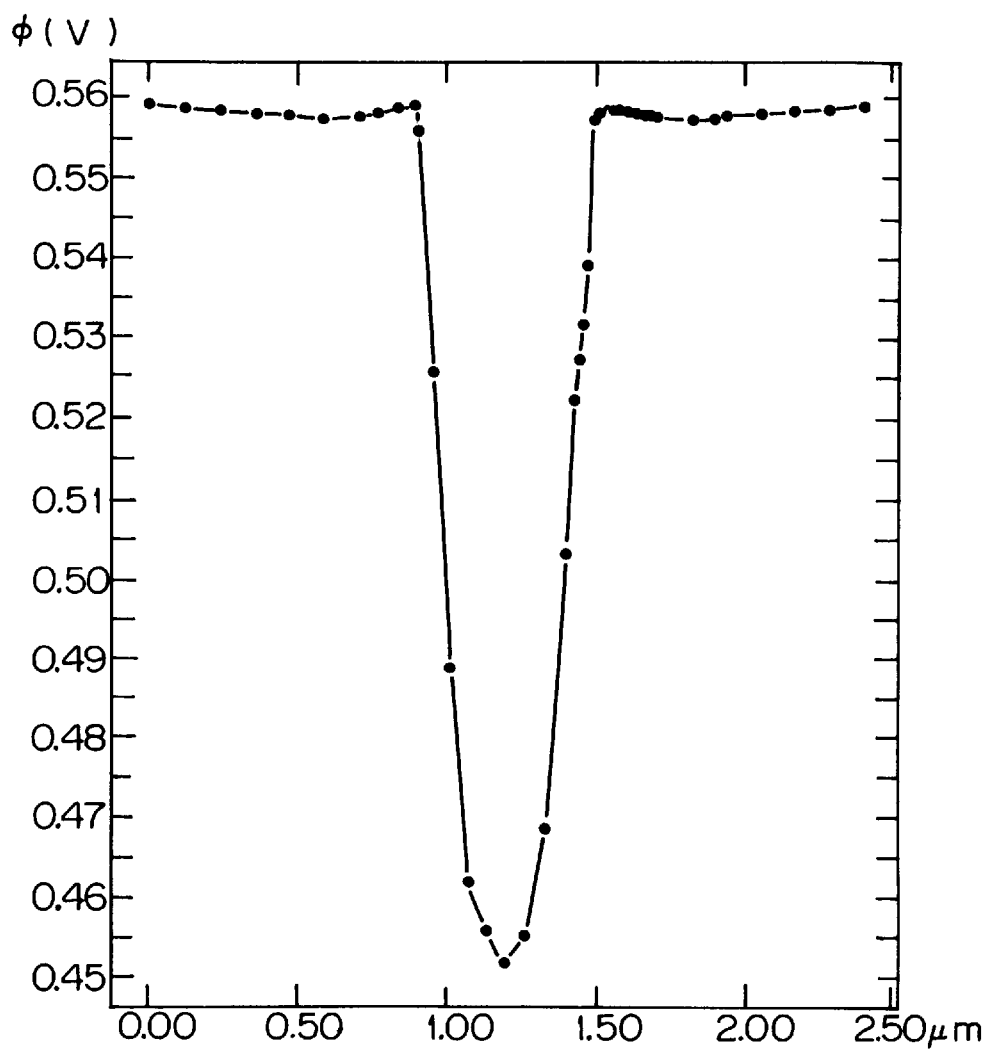
FIG. 22 is a graph showing a final potential obtained in the MOS transistor of FIG. 18.
Figure 23:
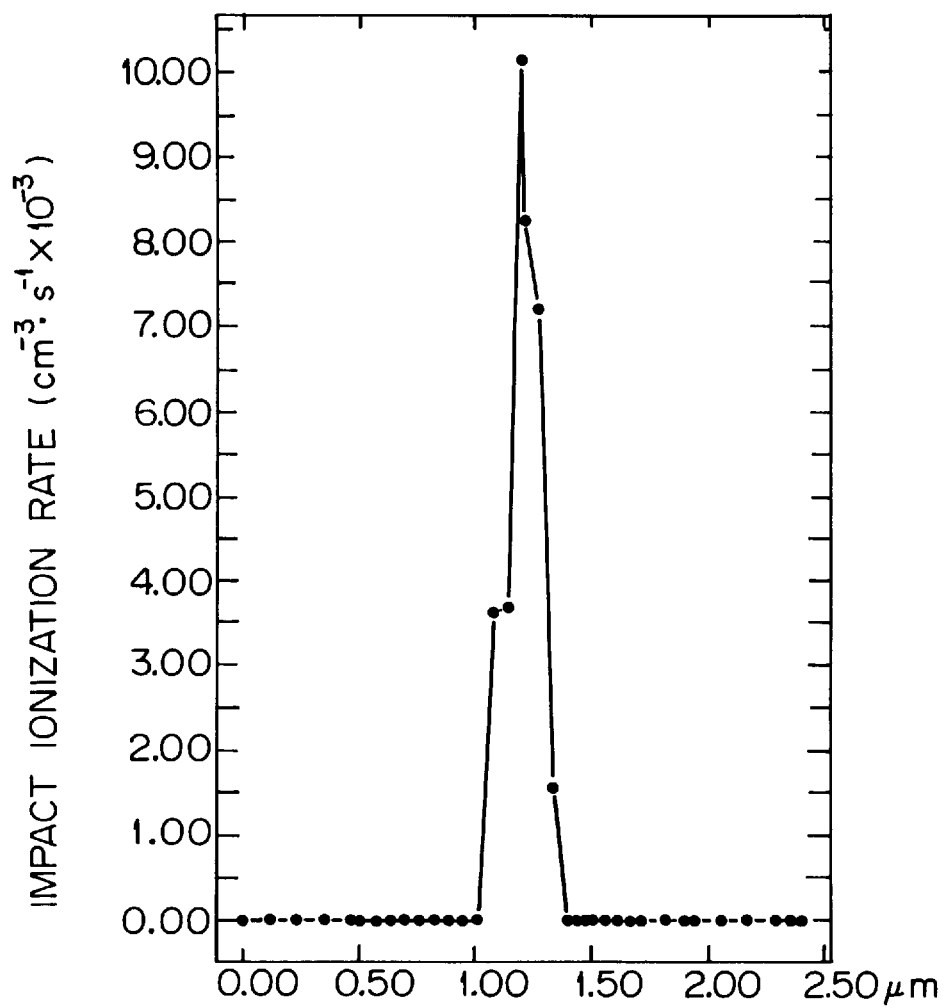
FIG. 23 is a graph showing a final impact ionization rate obtained in the MOS transistor of FIG. 18.

The other conditions for the simulating operation are as follows. Initially, a voltage of 0V is applied to the source electrode S, a voltage of 0.5V is applied to the gate electrode G, a voltage of 0V is applied to the drain electrode D, a voltage of 1.0V is applied to the electrode B of the substrate 1001. Then, the voltage applied to the gate electrode G is changed from 0.5V to 1.0V. In this case, the convergence characteristics which are represented by a maximum value of an absolute value of the potential fluctuation δφ are remarkably improved. Referring to the comparison in FIG. 21, here, β is $1.0 \times 10^4$V/cm and τ' is 3, for the method of FIGS. 6, 8A and 8B, while, in comparison, α is 0.075V in for the prior art method of FIG. 4. Also, a final potential φ and a final impact ionization rate are obtained as shown in FIGS. 22 and 23.

Although the above-described embodiment is applied to the coupled solution method, the present invention can also be applied to the decoupled solution method. Also, the present invention can be applied to an energy transfer model of a semiconductor device as well as a drift-diffusion model of a semiconductor device.

As explained hereinabove, according to the present invention, since deviations of parameters are reduced by applying a damping factor thereto for a strong nonlinearity region, the convergence characteristics of the parameters in a weak nonlinearity region are not deteriorated, thus decreasing the number of repetitions, to thereby reduce a calculation time.

I claim:

1. An iterative method for simulating a plurality of parameters including potentials in a semiconductor device, comprising the steps of:

a.) setting a mesh having a plurality of nodes in said semiconductor device;

b.) calculating deviations of each of said parameters for each of said nodes by Newton's method;

c.) calculating electric fields for a plurality of edges, each edge connecting two of said nodes, said calculation using a potential associated with each said connected nodes;

d.) determining whether or not an absolute value of each of said electric fields is larger than a first value;

e.) calculating deviations of said electric fields with respect to previous values thereof for each of said edges, when the absolute values of said electric fields are larger than said first value;

f.) determining whether or not an absolute value of each of said deviations of said electric fields is larger than a second value;

g.) renewing said parameters by adding said deviations of said parameters to said parameters when the absolute values of said electric fields are not larger than said first value or the absolute values of said deviations of said electric fields are not larger than said second value;

h.) renewing said parameters by adding values smaller than said deviations of said parameters to said parameters, when at least one of the absolute values of said electric fields is larger than said first value and at least one of the absolute values of said deviations of said electric fields is larger than said second value;

i.) calculating said values smaller than said deviations of said parameters by multiplying said deviations of said parameters by a damping factor less than 1, wherein said damping factor is a ratio of said second value to a maximum value of the absolute values of said deviations of said electric fields; and j.) repeating steps b.) through i.).

2. The method as set forth in claim 1, wherein said parameters except for the potential are an electron concentration and a hole concentration.

3. The method as set forth in claim 2, wherein said parameter deviation calculating step calculates the deviations of said parameters by solving charge conservation equations, electron current equations and hole current equations.

4. An iterative method for simulating a plurality of parameters including potentials in a semiconductor device, comprising the steps of:

a.) setting a mesh having a plurality of nodes in said semiconductor device;

b.) calculating deviations of each of said parameters for each of said nodes by Newton's method;

c.) calculating electric fields for a plurality of edges, each edge connected to two of said nodes, said calculation using a potential associated with each said connected nodes;

d.) determining whether or not an absolute value of each of said electric fields is larger than a first value;

e.) calculating ratios of said electric fields with respect to previous values thereof for each of said nodes, when the absolute values of said electric fields are larger than said first value;

f.) determining whether or not an absolute value of each of said ratios of said electric fields is larger than a second value;

g.) renewing said parameters by adding said deviations of said parameters to said parameters when the absolute values of said electric fields are not larger than said first value or said ratios of said electric fields are not larger than said second value;

h.) renewing said parameters by adding values smaller than said deviations of said parameters to said parameters when at least one of the absolute values of said electric fields is larger than said first value and at least one of said ratios of said electric fields is larger than said second value;

i. calculating said values smaller than said deviations of said parameters by multiplying said deviations of said parameters by a damping factor less than 1, wherein said damping factor is a ratio of said second value to a maximum value of the absolute values of said ratios of said electric fields; and j.) repeating steps b.) through i.).

5. The method as set forth in claim 4, wherein said parameters except for the potential are an electron concentration and a hole concentration.

6. The method as set forth in claim 4, wherein said parameter deviation calculating step calculates the deviation of said parameters by solving charge conservation equations, electron current equations and hole current equations.

7. An iterative method for simulating a plurality of parameters, including potentials in a semiconductor device, comprising the steps of:

a.) setting a mesh having a plurality of nodes in said semiconductor device, b.) calculating deviations of each of said parameters for each of said nodes by Newton's method;

c.) calculating electric fields for a plurality of edges, each edge connecting two of said nodes, said calculation using a potential associated with each said connected nodes;

d.) determining whether or not an absolute value of each of said electric fields is larger than a first value;

e.) calculating deviations of said electric fields with respect to previous values thereof for each of said edges, when the absolute values of said electric fields are larger than said first value;

f.) determining whether or not an absolute value of each of said deviations of said electric fields is larger than a second value;

g.) renewing said parameters by adding values smaller than said deviations of said parameters to said parameters, when at least one of the absolute values of said electric fields is larger than said first value and at least one of the absolute values of said deviations of said electric fields is larger than said second value;

h.) when said parameters are not renewed by the method of step f.), then renewing said parameters by adding said deviations of said parameters to said parameters; and i.) repeating steps b.) through h.).

8. The method as set forth in claim 7 wherein steps d.), e.), f.), and g.) are respectively replaced by the following steps h.), i.), j.), and k.):

h.) calculating ratios of said electric fields with respect to previous values thereof for each of said nodes, when the absolute values of said electric fields are larger than said first value;

i.) determining whether or not an absolute value of each of said ratios of said electric fields is larger than a second value;

j.) renewing said parameters by adding values smaller than said deviations of said parameters to said parameters, when at least one of the absolute values of said electric fields is larger than said first value and at least one of the absolute values of said ratios of said electric fields is larger than said second value; and k.) when said parameters are not renewed by the method of step j.), then renewing said parameters by adding said deviations of said parameters to said parameters.

9. The method as set forth in claim 8 further comprising:

calculating said values smaller than said deviations of said parameters by multiplying deviations of said parameters by a damping factor less than 1, wherein said damping factor is a ratio of said second value to a maximum value of the absolute values of said ratios of said electric fields.

10. The method as set forth in claim 7 further comprising:

calculating said values smaller than said deviations of said parameters by multiplying deviations of said parameters by a damping factor less than 1, wherein said damping factor is a ratio of said second value to a maximum value of the absolute values of said deviations of said electric fields.

11. The method as set forth in claim 7 wherein Newton's method further comprises a coupled solution method using Newton's method.

12. The method as set forth in claim 7 wherein Newton's method further comprises a decoupled solution method using Newton's method.

* * * * *